US012777144B2

(12) United States Patent
Zhang et al.

(10) Patent No.: US 12,777,144 B2
(45) Date of Patent: Oct. 27, 2026

(54) UTILIZATION OF RECURSIVE PREDICTION UNIT IN VIDEO CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 175 days.

(21) Appl. No.: 18/397,084

(22) Filed: Dec. 27, 2023

(65) Prior Publication Data

US 2024/0137498 A1 Apr. 25, 2024

Related U.S. Application Data

(63) Continuation of application No. PCT/CN2022/102809, filed on Jun. 30, 2022.

(30) Foreign Application Priority Data

Jun. 30, 2021 (WO) ................ PCT/CN2021/103549

(51) Int. Cl.
*H04N 19/107* (2014.01)
*H04N 19/117* (2014.01)
(Continued)

(52) U.S. Cl.
CPC ......... *H04N 19/107* (2014.11); *H04N 19/117* (2014.11); *H04N 19/132* (2014.11);
(Continued)

(58) Field of Classification Search
CPC .. H04N 19/107; H04N 19/117; H04N 19/132; H04N 19/176; H04N 19/184;
(Continued)

(56) References Cited

U.S. PATENT DOCUMENTS

2013/0136175 A1* 5/2013 Wang ..................... H04N 19/11 375/240.12
2017/0006309 A1* 1/2017 Liu ...................... H04N 19/597
(Continued)

FOREIGN PATENT DOCUMENTS

| | | | |
|---|---|---|---|
| CN | 103797801 | A | 5/2014 |
| CN | 110393011 | A | 10/2019 |
| WO | 2016091161 | A1 | 6/2016 |

OTHER PUBLICATIONS

Document: JVET-L0646-v5, Su, Y., et al., "CE4-related: Generalized bi-prediction improvements combined from JVET-L0197 and JVET-L0296," Joint Video Experts Team (JVET) of ITU-T SG 16 WP 3 and ISO/IEC JTC 1/SC 29/ WG 11 12th Meeting: Macao, CN, Oct. 3-12, 2018, 6 pages.

(Continued)

*Primary Examiner* — Matthew K Kwan
(74) *Attorney, Agent, or Firm* — Conley Rose, P.C.

(57) ABSTRACT

A mechanism for processing video data implemented by a video coding apparatus is disclosed. The mechanism determines to apply a prediction splitting tree to a prediction tree unit (PTU). The prediction splitting tree includes a leaf prediction unit (PU). A prediction mode is selected for the leaf PU based on whether the leaf PU is split from the PTU. The method performs a conversion between a visual media data and a bitstream based on the leaf PU.

18 Claims, 25 Drawing Sheets

(51) Int. Cl.
*H04N 19/132* (2014.01)
*H04N 19/176* (2014.01)
*H04N 19/184* (2014.01)
*H04N 19/52* (2014.01)
*H04N 19/593* (2014.01)
*H04N 19/70* (2014.01)
*H04N 19/96* (2014.01)

(52) U.S. Cl.
CPC ......... *H04N 19/176* (2014.11); *H04N 19/184* (2014.11); *H04N 19/52* (2014.11); *H04N 19/593* (2014.11); *H04N 19/70* (2014.11); *H04N 19/96* (2014.11)

(58) Field of Classification Search
CPC ...... H04N 19/52; H04N 19/593; H04N 19/70; H04N 19/96
USPC ...................................................... 375/240.13
See application file for complete search history.

(56) References Cited

U.S. PATENT DOCUMENTS

| | | | | |
|---|---|---|---|---|
| 2018/0098086 | A1* | 4/2018 | Chuang | H04N 19/198 |
| 2018/0176560 | A1* | 6/2018 | Mishurovskiy | H04N 19/167 |
| 2018/0367818 | A1 | 12/2018 | Liu | |
| 2020/0021833 | A1* | 1/2020 | Xu | H04N 19/176 |
| 2020/0053368 | A1* | 2/2020 | Urban | H04N 19/159 |
| 2021/0084309 | A1* | 3/2021 | Zhao | H04N 19/186 |
| 2021/0136422 | A1 | 5/2021 | Huang | |
| 2021/0235099 | A1* | 7/2021 | Park | H04N 19/176 |

OTHER PUBLICATIONS

Document: JVET-C0047, Chen, C., et al., "Generalized bi-prediction for inter coding," Joint Video Exploration Team (JVET) of ITU-T SG 16 WP 3 and ISO/IEC JTC 1/SC 29/WG 11 3rd Meeting: Geneva, CH, May 26-Jun. 1, 2016, 4 pages.
Document: JVET-K0248-v1, Su, Y., et al., "CE4.4.1: Generalized bi-prediction for inter coding," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Document: JVET-L0197-v4, Su, Y., et al., "CE4-Related: Generalized bi-prediction improvements," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-L0296, He, Y., et al., "CE4-related: Encoder speed-up and bug fix for generalized bi-prediction in BMS-2.1," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
Document: JVET-L0256_v2, Xiu, X., et al., "CE9-related: Complexity reduction and bit-width control for bi-directional optical flow (BIO)," Joint Video Experts Team (JVET) of ITU-T SG 16 WP 3 and ISO/IEC JTC 1/SC 29/WG 11 12th Meeting: Macao, CN, Oct. 3-12, 2018, 15 pages.
Document: JVET-M0063-v3, Chujoh, T., et al., "Non-CE9: An improvement of BDOF," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M0487, Xiu, X., et al., "CE9.1: Simplifications on bi-directional optical flow (BDOF)," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-K0143, Zhang, N., et al., "CE9.4.3 : Template Matching based Adaptive Merge Candidate Reorder," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Sullivan, G., et al., "Overview of the High Efficiency Video Coding (HEVC) Standard", IEEE Transactions on Circuits and Systems for Video Technology, vol. 22, No. 12, Dec. 2012, 20 pages.
Luthra, A., et al., "Overview of the H.264/AVC video coding standard", Proceedings of SPIE vol. 5203 Applications of Digital Image Processing XXVI, Optical Science and Technology, SPIE's 48th Annual Meeting, 2003, San Diego, California, United States, 16 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JEM-7.0: https://jvet.hhi.fraunhofer.de/svn/svn_HMJEMSoftware/tags/ HM-16.6-JEM-7.0, Mar. 12, 2024, 1 page.
"Series H: Audiovisual and Multimedia Systems Infrastructure of audiovisual services—Coding of moving video High efficiency video coding," Recommendation ITU-T H.265, Aug. 2021, 716 pages.
Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Patent for binary tree: https://patentscope.wipo.int/search/en/detail.jsf; jsessionid=B6F96E719C3DECA6BB5B0830F82F2478.wapp1nCdocId=WO2016091161 recNum=1 maxRec= office= prevFilter= sortOption= queryString= tab=FullText#fig0004, Retrieved Mar. 12, 2024, 7 pages.
Document: JVET-J1001-v2, "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.
Budagavi, M., et al., "Core Transform Design for the High Efficiency Video Coding (HEVC) Standard," IEEE Journal of Selected Topics in Signal Processing, vol. 7, No. 6, Dec. 2013, 13 pages.
International Search Report from PCT Application No. PCT/CN2022/102809 dated Oct. 8, 2022, 10 pages.

* cited by examiner

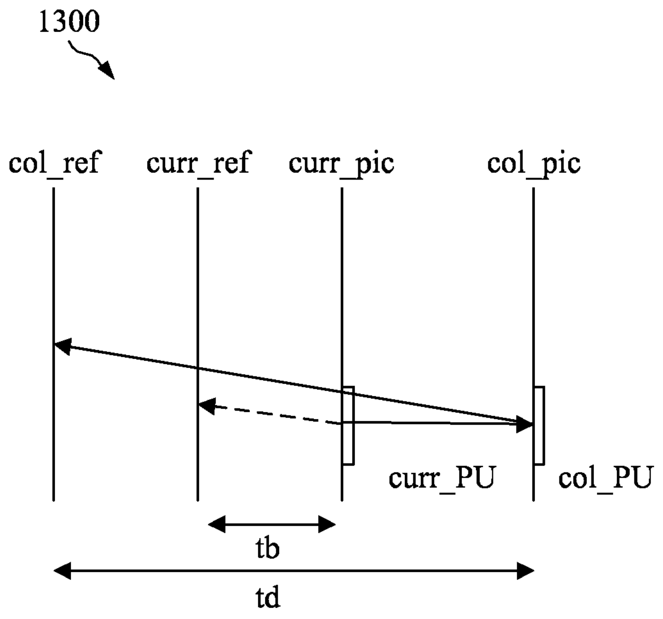
FIG. 13
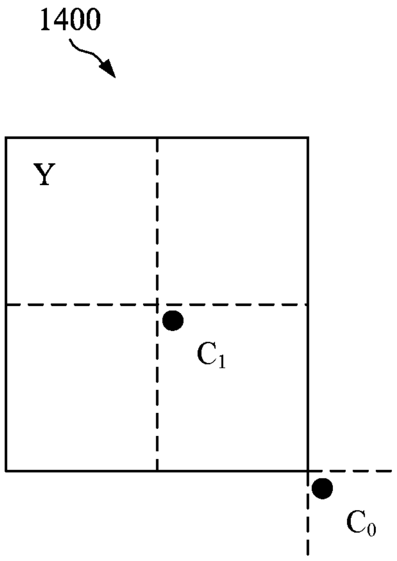
FIG. 14
1500
Merge candidate list
| Merge_idx | L0 | L1 |
|---|---|---|
| 0 | mvL0_A, ref0 | |
| 1 | | mvL1_B, ref0 |
| 2 | | |
| 3 | | |
| 4 | | |
↓
Merge candidate list w combined cadidates
| Merge_idx | L0 | L1 |
|---|---|---|
| 0 | mvL0_A, ref0 | |
| 1 | | mvL1_B, ref0 |
| 2 | mvL0_A, ref0 | mvL1_B, ref0 |
| 3 | | |
| 4 | | |
FIG. 15

3300

3400

UTILIZATION OF RECURSIVE PREDICTION UNIT IN VIDEO CODING

CROSS-REFERENCE TO RELATED APPLICATIONS

This application is a continuation of International Patent Application No. PCT/CN2022/102809 filed on Jun. 30, 2022, which claims the priority to and benefit of International Patent Application No. PCT/CN2021/103549 filed on Jun. 30, 2021. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to apply a prediction splitting tree to a prediction tree unit (PTU), wherein the prediction splitting tree includes a leaf prediction unit (PU), and wherein a prediction mode is selected for the leaf PU based on whether the leaf PU is split from the PTU; and performing a conversion between a visual media data and a bitstream based on the leaf PU.

Optionally, in any of the preceding aspects, another implementation of the aspect provides that intra mode is disallowed for the leaf PU when the leaf PU is split from the PTU.

Optionally, in any of the preceding aspects, another implementation of the aspect provides that combined inter-intra prediction (CIIP) is disallowed for the leaf PU when the leaf PU is split from the PTU.

Optionally, in any of the preceding aspects, another implementation of the aspect provides that template-matching-based inter mode is disallowed for the leaf PU when the leaf PU is split from the PTU.

Optionally, in any of the preceding aspects, another implementation of the aspect provides that local illumination compensation (LIC) is disallowed for the leaf PU when the leaf PU is split from the PTU.

Optionally, in any of the preceding aspects, another implementation of the aspect provides that a template-matching-based intra-mode is disallowed for the leaf PU when the leaf PU is split from the PTU.

Optionally, in any of the preceding aspects, another implementation of the aspect provides that the bitstream includes a syntax element indicating the prediction mode selected for the leaf PU, and wherein the syntax element excludes indications for all modes that are disallowed for the leaf PU.

Optionally, in any of the preceding aspects, another implementation of the aspect provides that the bitstream does not include any syntax element indicating any prediction mode that is disallowed for the leaf PU.

Optionally, in any of the preceding aspects, another implementation of the aspect provides that an operation of the prediction mode selected for the leaf PU is based on whether the leaf PU is split from the PTU.

Optionally, in any of the preceding aspects, another implementation of the aspect provides that a template of a template-matching-based inter mode employs prediction samples when the leaf PU is split from the PTU, and wherein the template of the template-matching-based inter mode employs reconstruction samples when the leaf PU is the PTU.

Optionally, in any of the preceding aspects, another implementation of the aspect provides that a template for the leaf PU in local illumination compensation (LIC) employs prediction samples when the leaf PU is split from the PTU, and wherein the template for the leaf PU in LIC employs reconstruction samples when the leaf PU is the PTU.

Optionally, in any of the preceding aspects, another implementation of the aspect provides that application of a transform, an inverse-transform, a quantization, an intra prediction, or a dequantization to a coding unit (CU) containing the leaf PU depends on whether the leaf PU is split from the PTU.

Optionally, in any of the preceding aspects, another implementation of the aspect provides that splits are disallowed for the PTU based on a slice type, a picture type, a syntax element in the bitstream, a width of the PTU, a height of the PTU, a coding tool, a specified coding mode or combinations thereof.

Optionally, in any of the preceding aspects, another implementation of the aspect provides that splits are disallowed for the PTU when the PTU is contained in an intra coding (I) slice.

Optionally, in any of the preceding aspects, another implementation of the aspect provides that splits are disallowed for the PTU when the PTU contains chroma components.

Optionally, in any of the preceding aspects, another implementation of the aspect provides that splits are disallowed for the PTU based on a syntax element contained in a sequence parameter set (SPS), a picture parameter set (PPS), a picture header, a slice header, or combinations thereof.

Optionally, in any of the preceding aspects, another implementation of the aspect provides that splits are disallowed for the PTU when a size of the PTU is less than a certain value.

Optionally, in any of the preceding aspects, another implementation of the aspect provides that splits are disallowed for the PTU when a local dual tree is used on a CU containing the PTU.

Optionally, in any of the preceding aspects, another implementation of the aspect provides that splits are disallowed for the PTU when an intra mode is used.

Optionally, in any of the preceding aspects, another implementation of the aspect provides that prediction samples on boundaries between two PUs in a CU are filtered prior to being used for residual generation at an encoder.

Optionally, in any of the preceding aspects, another implementation of the aspect provides that prediction samples on boundaries between two PUs in a CU are affected by overlapped block motion compensation (OBMC) prior to being used for residual generation at an encoder.

Optionally, in any of the preceding aspects, another implementation of the aspect provides that prediction samples on at least one of a bottom boundary, a top boundary, a right boundary, or a left boundary of the leaf PU are affected by OBMC when the leaf PU is split from the PTU.

Optionally, in any of the preceding aspects, another implementation of the aspect provides that the leaf PU being split from the PTU comprises the leaf PU being split from a PU of the PTU.

Optionally, in any of the preceding aspects, another implementation of the aspect provides that the conversion includes encoding the visual media data into the bitstream.

Optionally, in any of the preceding aspects, another implementation of the aspect provides that the conversion includes decoding the bitstream to obtain the visual media data.

A second aspect relates to an apparatus for processing video data comprising: a processor; and a non-transitory memory with instructions thereon, wherein the instructions upon execution by the processor, cause the processor to perform the method of any of the preceding aspects.

A third aspect relates to a non-transitory computer-readable recording medium storing a bitstream of a video which is generated by a method performed by a video processing apparatus, wherein the method comprises: determining to apply a prediction splitting tree to a prediction tree unit (PTU), wherein the prediction splitting tree includes a leaf prediction unit (PU), and wherein a prediction mode is selected for the leaf PU based on whether the leaf PU is split from the PTU; and generating a bitstream based on the determining.

A fourth aspect relates to a method for storing bitstream of a video comprising: determining to apply a prediction splitting tree to a prediction tree unit (PTU), wherein the prediction splitting tree includes a leaf prediction unit (PU), and wherein a prediction mode is selected for the leaf PU based on whether the leaf PU is split from the PTU; generating a bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 13 is a schematic diagram illustrating motion vector scaling for a temporal merge candidate when employing merge mode.

FIG. 14 is a schematic diagram illustrating candidate positions for a temporal merge candidate when employing merge mode.

FIG. 15 is a schematic diagram illustrating an example of a combined bi-predictive merge candidate list.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure is related to image/video coding, and more particularly to partitioning of a picture. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
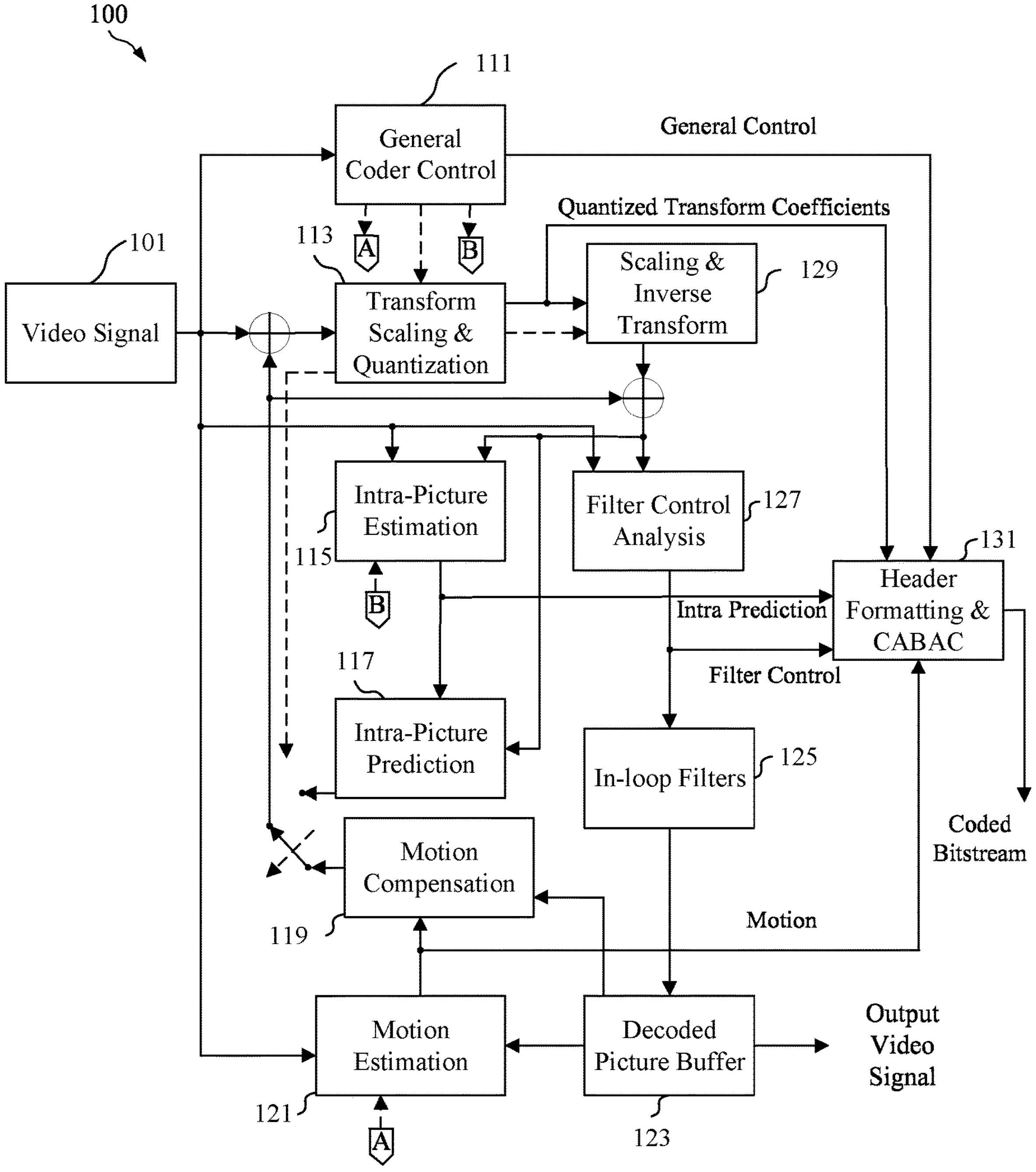
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), ternary tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter prediction. A video unit (e.g., a picture, a slice, a CTU, etc.) of the video signal 101 may be divided into multiple blocks. Motion estimation component 121 and the motion compensation component 119 perform inter predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, a video codec, such as codec 100, may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 2:
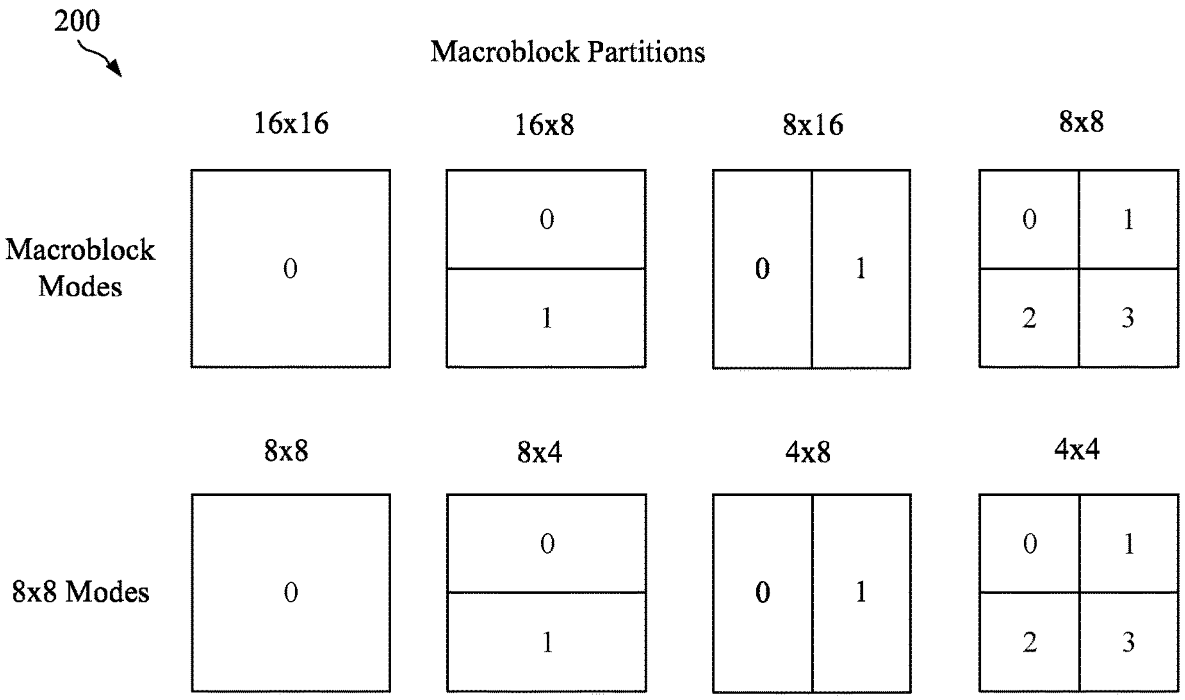
FIG. 2 is a schematic diagram of example macroblock partitions.

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

Figure 3:
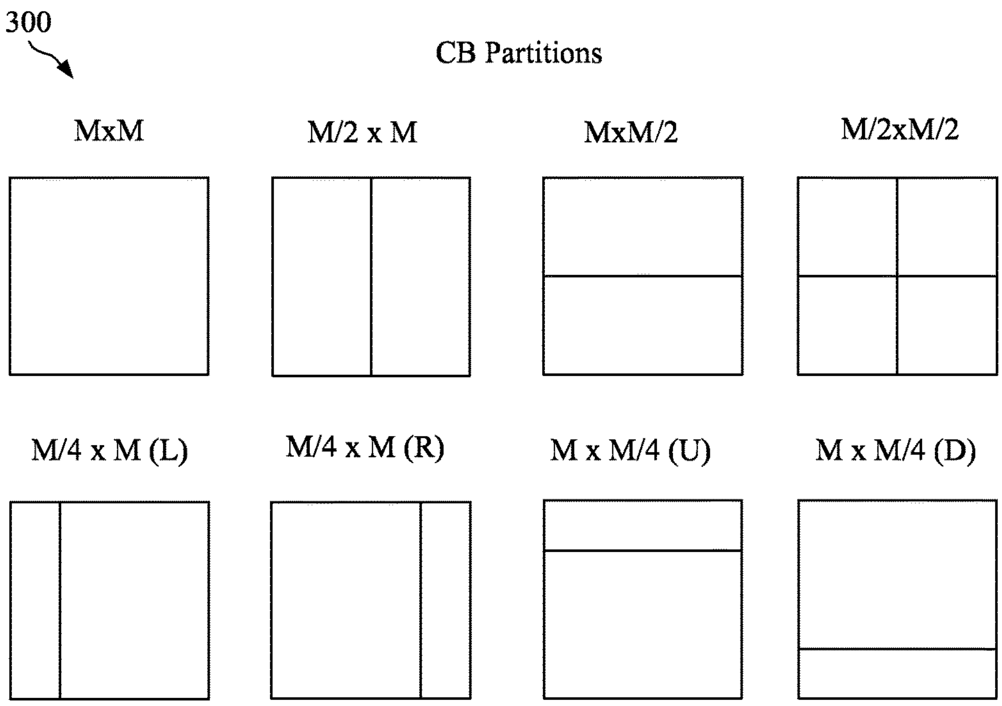
FIG. 3 is a schematic diagram of example modes for partitioning coding blocks, for example according to High Efficiency Video Coding (HEVC).

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figure 4:
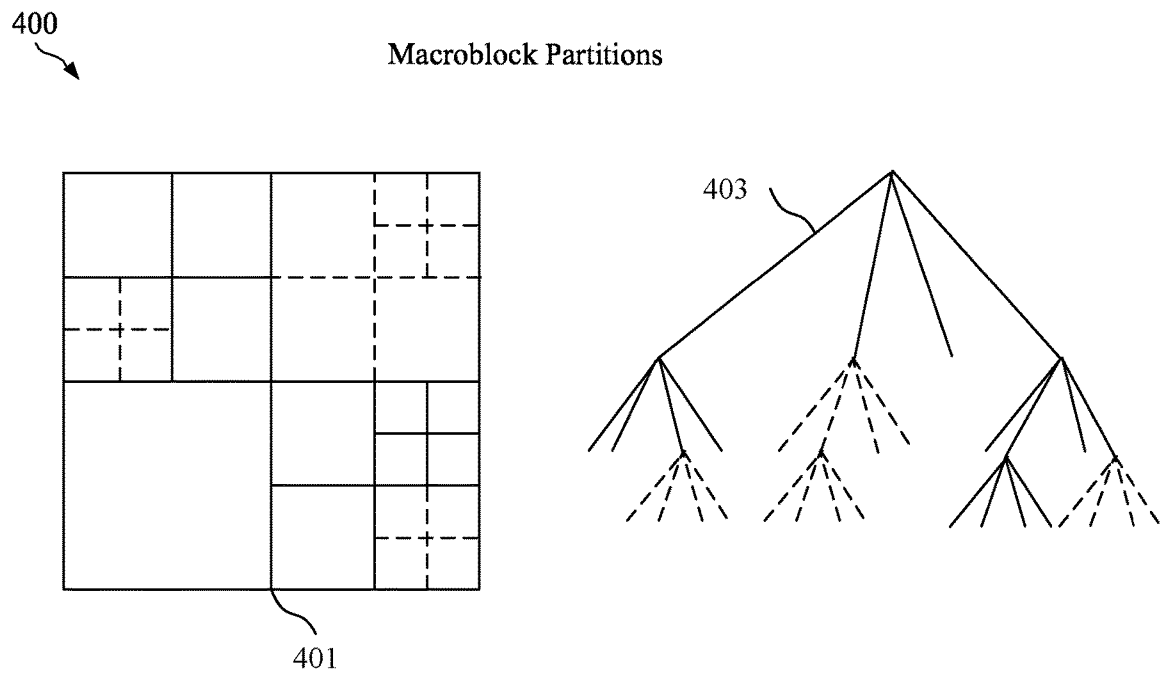
FIG. 4 is a schematic diagram of example method for partitioning a picture for coding residual.

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

Figure 5:
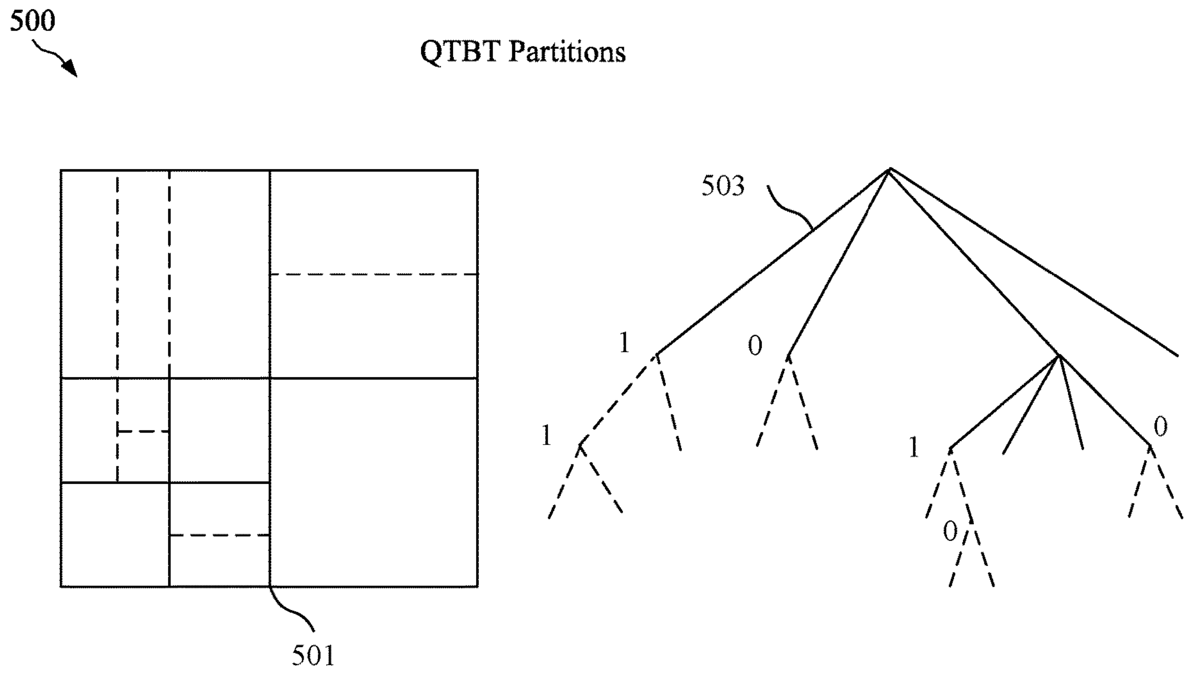
FIG. 5 is a schematic diagram of example method for partitioning a picture, for example according to a quad tree binary tree (QTBT) structure.

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signaled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 6:
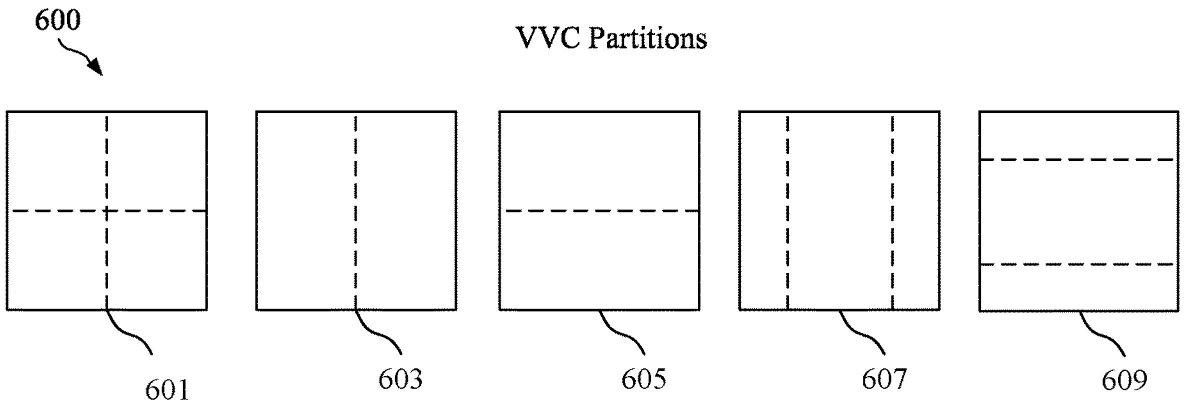
FIG. 6 is a schematic diagram of example partitioning structures used in Versatile Video Coding (VVC).

Triple-tree partitioning for VVC is now discussed. FIG. 6 is a schematic diagram 600 of example partitioning structures used in VVC. As shown, split types other than quad tree and binary-tree are supported in VVC. For example, schematic diagram 600 includes a quad tree partition 601, a vertical binary tree partition 603, a horizontal binary tree partition 605, a vertical ternary tree partition 607, and a horizontal ternary tree partition 609. This approach introduces two ternary tree (TT) partitions in addition to the quad tree and binary trees. It should be noted that a ternary tree may also be referred to as a triple tree in some examples.

In an example implementation, a VVC partitions a CTU into coding units by QT. Then, the CTU further partitioned by a BT or a TT. A leaf CU is a basic coding unit. The leaf CU may also be called a CU for convenience. In an example implementation, a leaf CU cannot be further split. Prediction and transform are both applied on CU in the same way as JEM. The whole partition structure is named multiple-type-tree (MTT).

Figure 7:
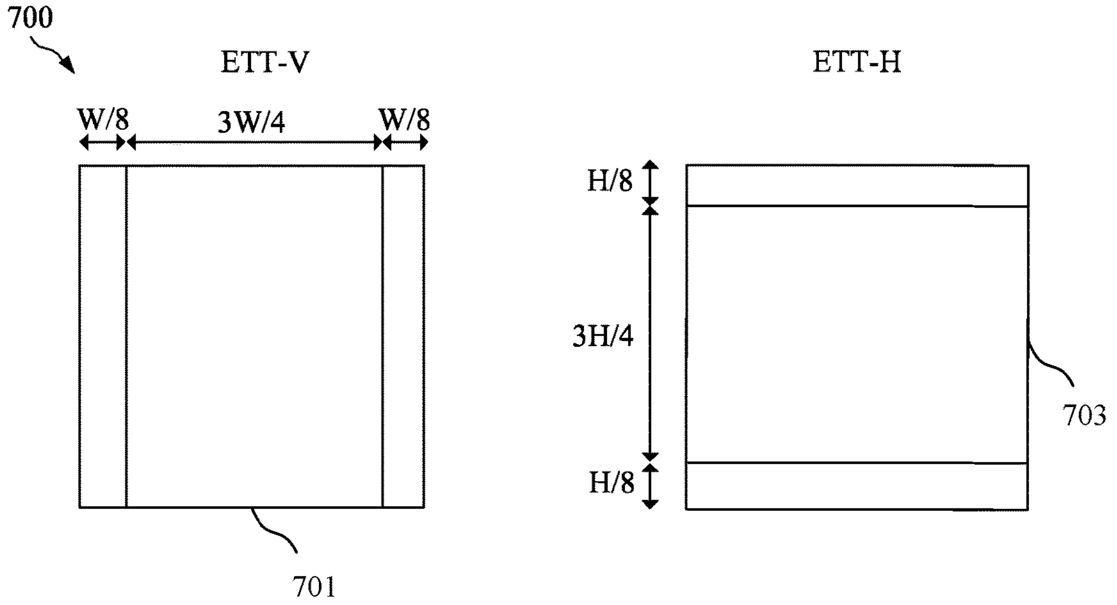
FIG. 7 is a schematic diagram of example Extended Ternary-Tree (ETT) partitioning structures.

FIG. 7 is a schematic diagram 700 of example ETT partitioning structures, including an ETT-V split 701 and an ETT-H split 703. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=2N2 with any positive integer N2. In another example, H2 cannot be in a form of $H2=2^{N2}$ with any positive integer N2. In one example, at least one of the parameters is in the form of power of 2. In one example, W1 is in a form of $W1=2^{N1}$ with a positive integer N1. In another example, H1 is in a form of $H\mathbf{1}=2^{N1}$ with a positive integer N1.

In one example, ETT only splits one partition in a vertical direction, for example where W1=a1*W, W2=a2W, and W3=a3*W, where a1+a2+a3=1, and where H1=H2=H3=H. This kind of ETT is vertical split and may be referred to as ETT-V. In one example, ETT-V split 701 can be used where W1=W/8, W2=3*W/4, W3=W/8, and H1=H2=H3=H. In one example, ETT only splits one partition in horizontal direction, for example where H1=a1*H, H2=a2*H, and H3=a3*H, where a1+a2+a3=1, and where W1=W2=W3=W. This kind of ETT is a horizontal split and may be referred to as ETT-H. In one example, ETT-H split 703 can be used where H1=H/8, H2=3*H/4, H3=H/8, and W1=W2=W3=W.

Figure 8:
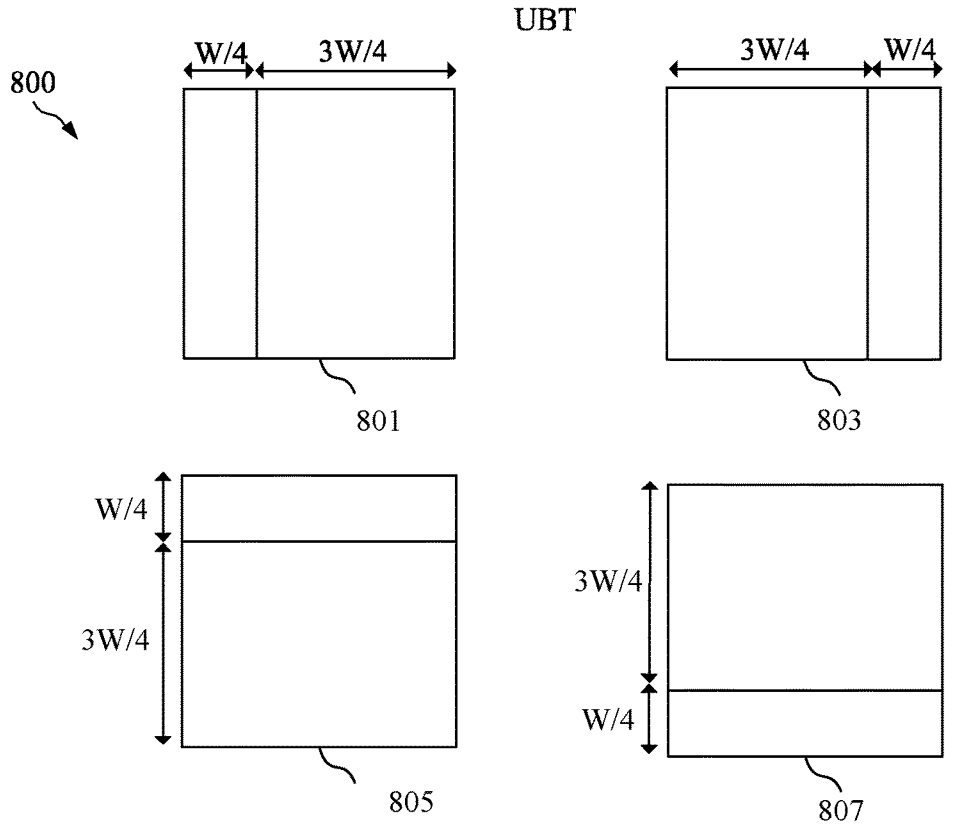
FIG. 8 is a schematic diagram of example 1/4 Unsymmetric Binary Tree (UBT) partitioning structures.

FIG. 8 is a schematic diagram 800 of example ¼ partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1-a)×W, and H1=H2=H. In such a case, the partition may be called a vertical UBT (UBT-V). In one example, a may be smaller than 1/2, such as 1/4, 1/8, 1/16, 1/32, 1/64, etc. In such a case, the partition may be called a Type 0 UBT-V, an example of which is shown as split 801. In one example, a may be larger than 1/2, such as 3/4, 7/8, 15/16, 31/32, 63/64, etc. In such a case, the partition is called a Type 1 UBT-V, an example of which is shown as split 803. In one example, H1=a×H, H2=(1-a)×H, W1=W2=W. In such a case, the partition may be called a horizontal UBT (UBT-H). In one example, a may be smaller than 1/2, such as 1/4, 1/8, 1/16, 1/32, 1/64, etc. In such a case, the partition is called a Type 0 UBT-H, an example of which is shown as split 805. In one example, a may be larger than 1/2, such as 3/4, 7/8, 15/16, 31/32, 63/64, etc. In such a case, the partition may be called a Type 1 UBT-H, an example of which is shown as split 807.

Inter prediction is now discussed, for example as used in HEVC. Inter prediction is the process of coding a block in current picture based on a reference block in a different picture called a reference picture. Inter prediction relies on the fact that the same objects tend to appear in multiple pictures in most video streams. Inter prediction matches a current block with a group of samples to a reference block in another picture with similar samples (e.g., generally depicting the same object at a different time in a video sequence). Instead of encoding each of the samples, the current block is encoded as a motion vector (MV) pointing to the reference block. Any difference between the current block and the reference block is encoded as residual. Accordingly, the current block is coded by reference to the reference block. At the decoder side, the current block can be decoded using only the MV and the residual so long as the reference block has already been decoded. Blocks coded according to inter prediction are significantly more compressed than blocks coded according to intra prediction. Inter prediction can be performed as unidirectional inter prediction or bidirectional inter prediction. Unidirectional inter prediction uses a MV pointing to a single block in a single reference picture and bidirectional inter prediction uses two MVs pointing to two different reference blocks in two different reference pictures. A slice of a picture coded according to unidirectional inter prediction is known as a P slice and a slice of a picture coded according to bidirectional inter prediction is known as a B slice. The portion of the current block that can be predicted from the reference block is known as a prediction unit (PU). Accordingly, a PU plus the corresponding residual results in the actual sample values in a CU of a coded block.

Each inter predicted PU has motion parameters for one or two reference picture lists. Motion parameters include a motion vector and a reference picture index. Usage of one of the two reference picture lists may also be signaled using inter prediction identification (ID) code (inter_red_ idc). Motion vectors may be explicitly coded as deltas (differences) relative to predictors. The following described various mechanisms for encoding the motion parameters.

When a CU is coded with skip mode, one PU is associated with the CU, and there are no significant residual coefficients, no coded motion vector delta or reference picture index is used. A merge mode can also be specified whereby the motion parameters for the current PU are obtained from neighboring PUs, including spatial and temporal candidates. The parameters can then be signaled by employing an index that corresponds to a selected candidate or candidates. Merge mode can be applied to any inter predicted PU, and is not limited to skip mode. The alternative to merge mode is the explicit transmission of motion parameters. In this case, a motion vector (coded as a motion vector difference compared to a motion vector predictor), a corresponding reference picture index for each reference picture list, and reference picture list usage are signaled explicitly for each PU. This signaling mode is referred to as AMVP.

When signaling indicates that one of the two reference picture lists is to be used, the PU is produced from one block of samples. This is referred to as uni-prediction. Uni-prediction is available both for P-slices and B-slices. When signaling indicates that both of the reference picture lists are to be used, the PU is produced from two blocks of samples. This is referred to as 'bi-prediction'. Bi-prediction is available for B-slices only.

The following text provides the details on the inter prediction modes in HEVC. Merge mode is now discussed. Merge mode generates a list of candidate MVs. The encoder selects a candidate MV as the MV for a block. The encoder then signals an index corresponding to the selected candidate. This allows the MV to be signaled as a single index value. The decoder generates the candidate list in the same manner as the encoder and uses the signaled index to determine the indicated MV.

Figure 9:
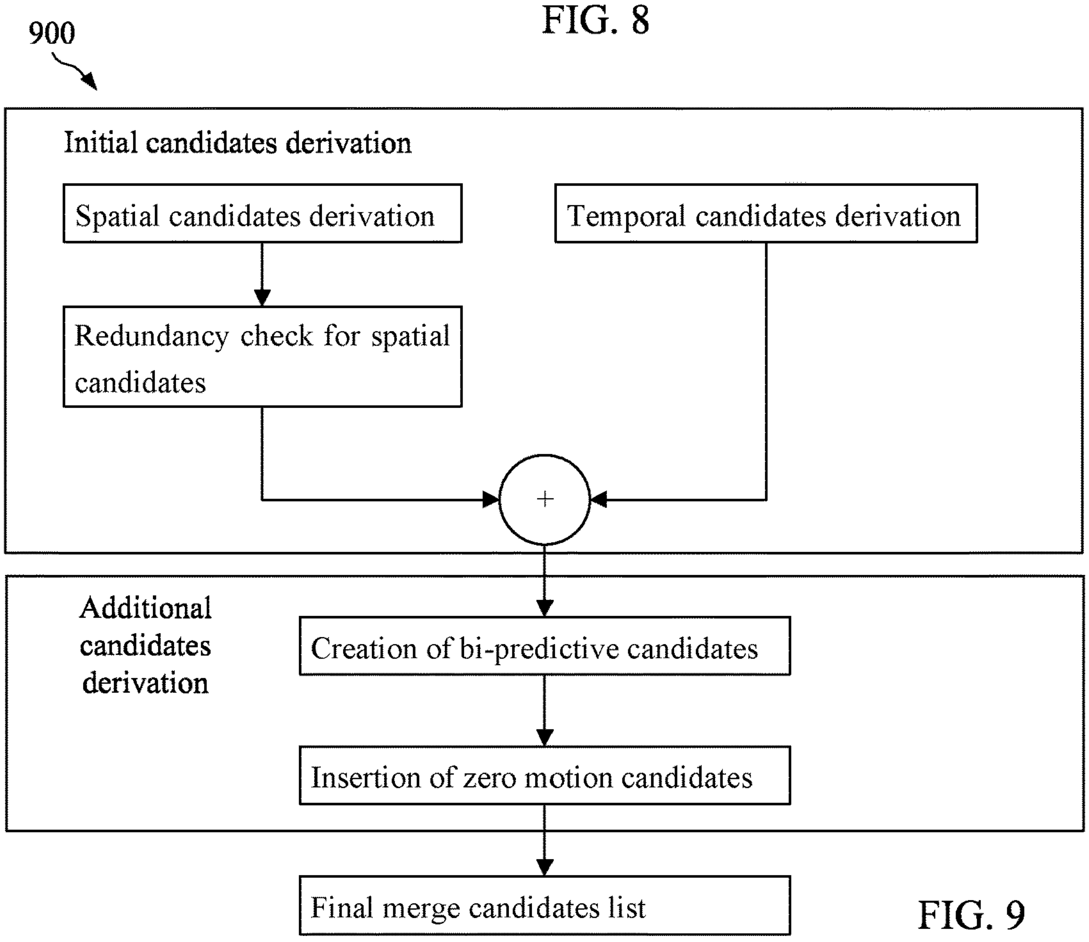
FIG. 9 is a schematic diagram of an example process for deriving a candidate list in merge mode as used for video coding according to inter prediction.

FIG. 9 is a schematic diagram of an example process 900 for deriving a candidate list in merge mode as used for video coding according to inter prediction. Accordingly, derivation of candidates for merge mode is now discussed. When a PU is predicted using merge mode, an index pointing to an entry in the merge candidates list is parsed from the bitstream and used to retrieve the motion information. The construction of this list can be summarized according to the following sequence of steps as shown in process 900. Step 1 includes initial candidates derivation. Step 1.1 includes spatial candidates derivation. Step 1.2 includes a redundancy check for spatial candidates. Step 1.3 includes temporal candidates derivation. Step 2 includes additional candidates derivation. Step 2.1 includes creation of bi-predictive candidates. Step 2.2 includes insertion of zero motion candidates, which results in a final merge candidates list as shown in process 900.

For spatial merge candidate derivation, a maximum of four merge candidates are selected among candidates that are located in five different positions. For temporal merge candidate derivation, a maximum of one merge candidate is selected among two candidates. Since a constant number of candidates for each PU is assumed at the decoder, additional candidates are generated when the number of candidates obtained from step 1 does not reach the maximum number of merge candidate (MaxNumMergeCand), which is signaled in slice header. Since the number of candidates is constant, an index of best merge candidate is encoded using truncated unary binarization (TU). If the size of CU is equal to 8, all the PUs of the current CU share a single merge candidate list, which is identical to the merge candidate list of the 2N×2N prediction unit.

Figure 10:
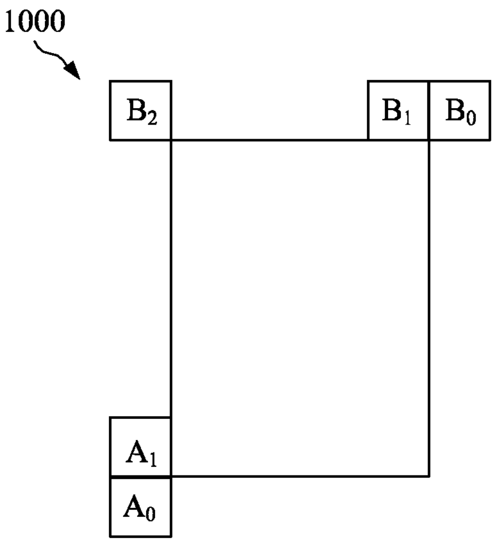
FIG. 10 is a schematic diagram illustrating example positions of spatial merge candidates used in merge mode.

FIG. 10 is a schematic diagram illustrating example positions 1000 of spatial merge candidates used in merge mode, which are used for spatial candidates derivation. In the derivation of spatial merge candidates, a maximum of four merge candidates are selected among candidates located in the positions 1000. The order of derivation is $A_1$, $B_1$, $B_0$, $A_0$, and $B_2$. Position $B_2$ is considered only when any PU of position $A_1$, $B_1$, $B_0$, and $A_0$ is not available (e.g., because the position is part of another slice or tile) or is intra coded. After the candidate at position $A_1$ is added, the addition of the remaining candidates is subject to a redundancy check, which ensures that candidates with same motion information are excluded from the list so that coding efficiency is improved.

Figure 11:
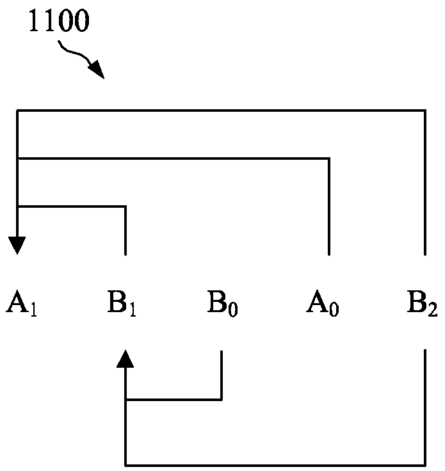
FIG. 11 is a schematic diagram illustrating example candidate pairs considered for a redundancy check of spatial merge candidates used in merge mode.

FIG. 11 is a schematic diagram illustrating example candidate pairs 1100 considered for a redundancy check of spatial merge candidates used in merge mode. To reduce computational complexity, not all possible candidate pairs 1100 are considered in the mentioned redundancy check. Instead, only the pairs 1100 linked with an arrow are considered. A candidate is only added to the list when the corresponding candidate used for redundancy check does not include the same motion information.

Figure 12:
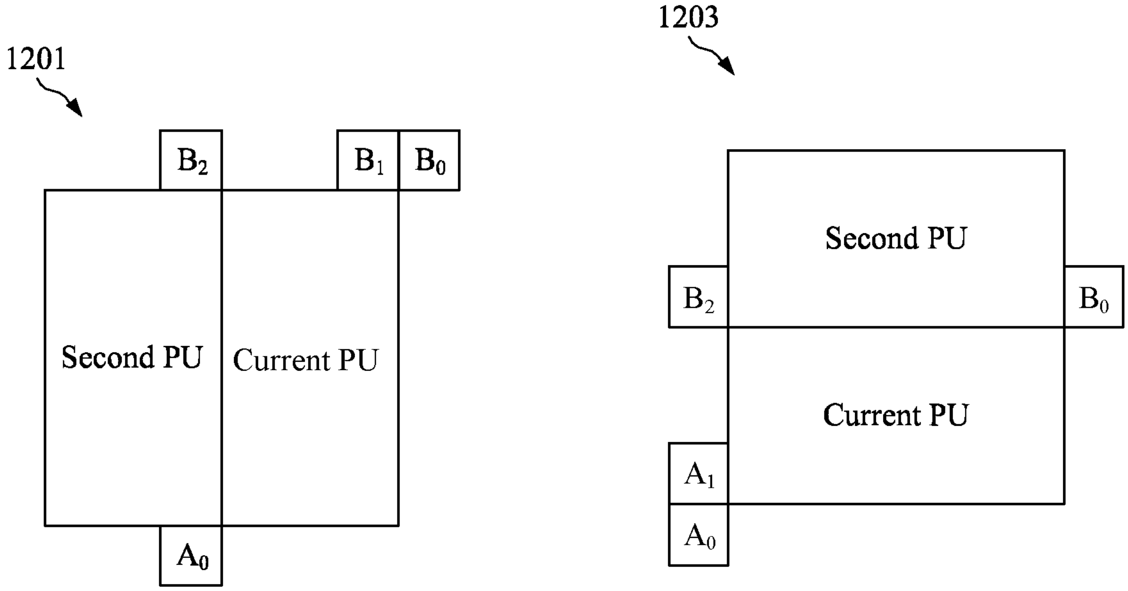
FIG. 12 is a schematic diagram illustrating example positions for a second prediction unit (PU) used when deriving spatial merge candidates for a current PU when employing merge mode.

FIG. 12 is a schematic diagram illustrating example positions for a second PU used when deriving spatial merge candidates for a current PU when employing merge mode. The positions include a partition 1201 of N×2N and a partition 1203 of 2N×N. Another source of duplicate motion information is the second PU associated with partitions different from 2N×2N. When the current PU is partitioned as N×2N as shown in partition 1201, the candidate at position $A_1$ as illustrated in FIG. 10 is not considered for list construction. Adding the candidate at position $A_1$ leads to two prediction units having the same motion information, which is redundant. Similarly, position $B_1$ as illustrated in FIG. 10 is not considered when the current PU is partitioned as 2N×N as shown in partition 1203.

FIG. 13 is a schematic diagram illustrating motion vector scaling 1300 for a temporal merge candidate when employing merge mode. Temporal candidate derivation in merge mode is now discussed. In this step, only one candidate is added to the merge candidate list. In the derivation of this temporal merge candidate, a scaled motion vector is derived based on a co-located PU in a picture which has the smallest picture order count (POC) difference with a current picture within a given reference picture list. The reference picture list to be used for derivation of the co-located PU is explicitly signaled in the slice header. The scaled motion vector for the temporal merge candidate is obtained as shown by the dotted line in FIG. 13. The temporal merge candidate is scaled from the motion vector of the co-located PU using the POC distances tb and td. tb is defined to be the POC difference between the reference picture of the current picture and the current picture. td is defined to be the POC difference between the reference picture of the co-located picture and the co-located picture. The reference picture index of temporal merge candidate is set equal to zero. For a B-slice, two motion vectors are obtained and combined to make the bi-predictive merge candidate. One motion vector is for reference picture list 0 and the other is for reference picture list 1.

FIG. 14 is a schematic diagram 1400 illustrating candidate positions for a temporal merge candidate when employing merge mode. In the co-located PU, denoted as Y, in the reference frame, the position for the temporal candidate is selected between candidates $C_0$ and $C_1$, as depicted in diagram 1400. If the PU at position $C_0$ is not available, is intra coded, or is outside of the current CTU row, position $C_1$ is used. Otherwise, position $C_0$ is used in the derivation of the temporal merge candidate.

FIG. 15 is a schematic diagram 1500 illustrating an example of a combined bi-predictive merge candidate list. Additional candidate insertion is now discussed. Besides spatial and temporal merge candidates, combined bi-predictive merge candidates and a zero merge candidate can also be employed. Combined bi-predictive merge candidates are generated by utilizing spatial and temporal merge candidates. A combined bi-predictive merge candidate is only used for B slices. The combined bi-predictive candidates are generated by combining the first reference picture list motion parameters of an initial candidate with second reference picture list motion parameters of another. If these two tuples provide different motion hypotheses, they form a new bi-predictive candidate. As an example, diagram 1500 depicts the case when two candidates in the original merge candidate lists list zero (L0) and list one (L1), which include mvL0 and refIdxL0 or mvL1 and refIdxL1, are used to create a combined bi-predictive merge candidate list with combined candidates. There are numerous rules regarding the combinations which are considered to generate these additional merge candidates.

Zero motion candidates are inserted to fill the remaining entries in the merge candidates list, and therefore hit the MaxNumMergeCand capacity. These candidates have zero spatial displacement and a reference picture index which starts from zero and increases every time a new zero motion candidate is added to the list. The number of reference frames used by these candidates is one and two for unidirectional and bidirectional prediction, respectively. Finally, no redundancy check is performed on these candidates.

Motion estimation regions for parallel processing is now discussed. To speed up the encoding process, motion estimation can be performed in parallel whereby the motion vectors for all prediction units inside a specified region are derived simultaneously. The derivation of merge candidates from a spatial neighborhood may interfere with parallel processing. This is because one prediction unit cannot derive the motion parameters from an adjacent PU until the adjacent PU's associated motion estimation is completed. To mitigate the trade-off between coding efficiency and processing latency, HEVC defines the motion estimation region (MER) whose size is signaled in the picture parameter set using the log2_parallel_merge_level_minus2 syntax element. When a MER is defined, merge candidates falling in the same region are marked as unavailable and therefore not considered in the list construction.

Figure 16:
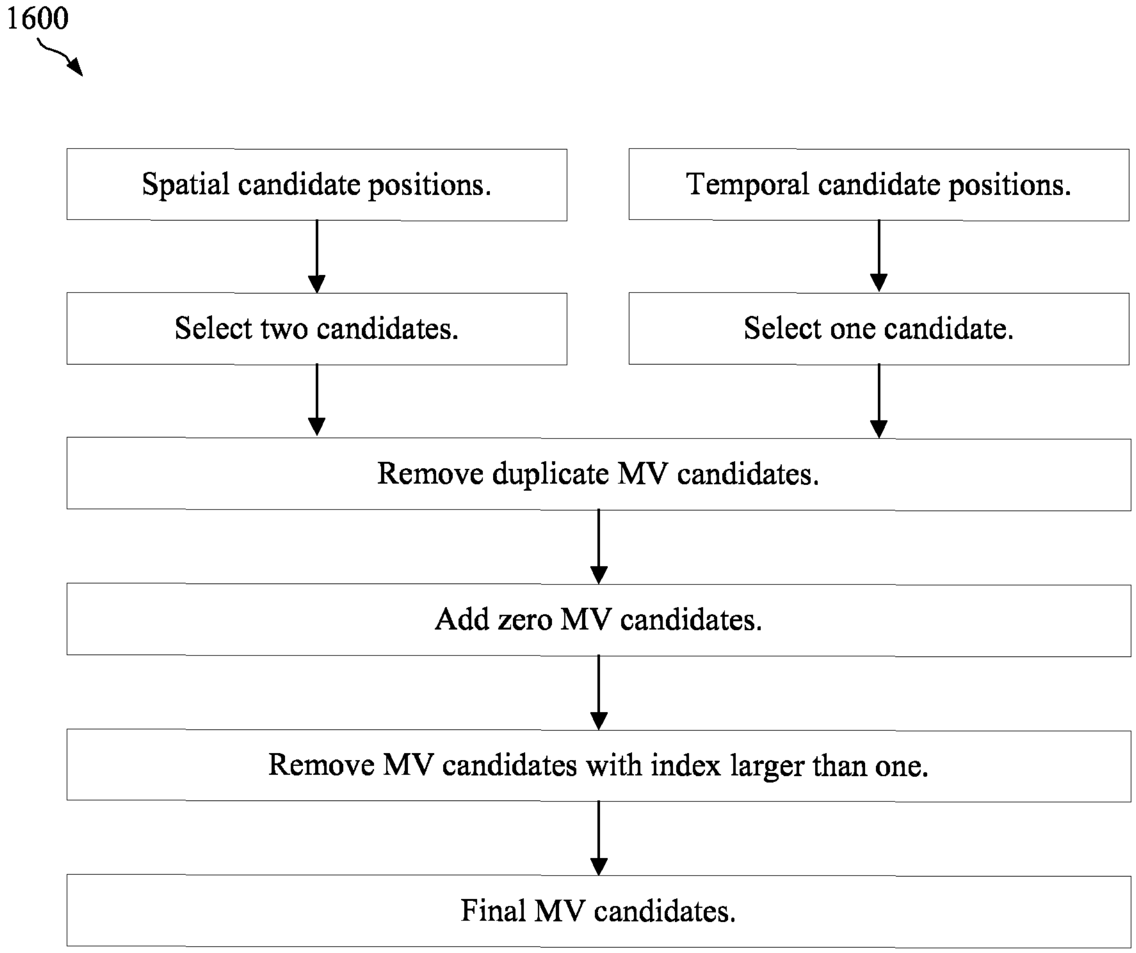
FIG. 16 is a flow chart illustrating a method of deriving motion vector prediction candidates in advanced motion vector prediction (AMVP).

FIG. 16 is a flow chart illustrating a method 1600 of deriving motion vector prediction candidates in AMVP. AMVP exploits the spatio-temporal correlation of motion vector with neighboring PUs, which is used for explicit transmission of motion parameters. For each reference picture list, a motion vector candidate list is constructed by checking availability of left and above temporally neighboring PU positions. Redundant candidates are then removed. Zero vectors are added to set the candidate list to a constant length. The encoder can select the best predictor from the candidate list and transmit the corresponding index indicating the chosen candidate. Similarly, with merge index signaling, the index of the best motion vector candidate is encoded using truncated unary code. The maximum value to be encoded in this case is 2 as shown in method 1600.

In motion vector prediction, spatial motion vector candidates and temporal motion vector candidates are considered. For spatial motion vector candidate derivation, two motion vector candidates are eventually derived based on motion vectors of each PU located in five different positions as depicted in FIG. 10. For temporal motion vector candidate derivation, one motion vector candidate is selected from two candidates derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

Spatial motion vector candidates are now discussed. In the derivation of spatial motion vector candidates, a maximum of two candidates are considered among five potential candidates as derived from PUs located in positions as depicted in FIG. 10. The positions are the same as those of motion merge. The order of derivation for the left side of the current PU is $A_0$, $A_1$, scaled $A_0$, and scaled $A_1$. The order of derivation for the above side of the current PU is $B_0$, $B_1$, $B_2$, scaled $B_0$, scaled $B_1$, and scaled $B_2$. Therefore, for each side there are four cases that can be used as motion vector candidate. This includes two cases not required to use spatial scaling, and two cases where spatial scaling is used. The four different cases are summarized as follows. No spatial scaling cases include (1) same reference picture list, and same reference picture index (same POC); and (2) different reference picture list, but same reference picture (same POC). Spatial scaling includes (3) same reference picture list, but different reference picture (different POC); and (4) different reference picture list, and different reference picture (different POC).

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
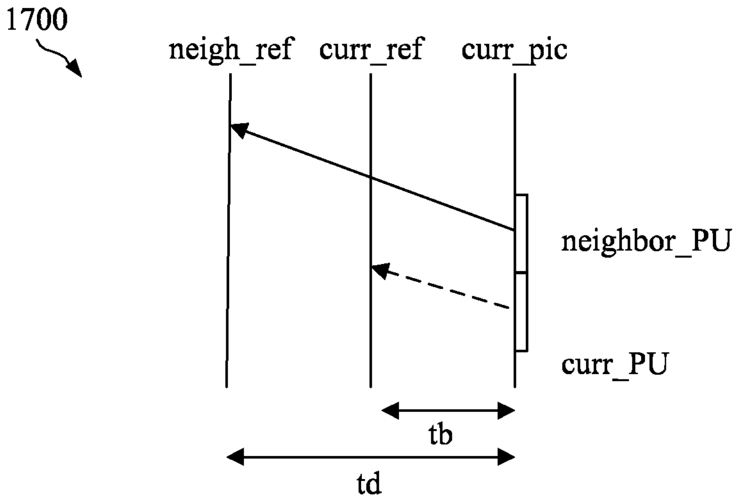
FIG. 17 is a schematic diagram illustrating an example of motion vector scaling for a spatial motion vector candidate.

FIG. 17 is a schematic diagram 1700 illustrating an example of motion vector scaling for a spatial motion vector candidate. In a spatial scaling process, the motion vector of the neighboring PU is scaled in a similar manner as temporal scaling as depicted in diagram 1700. The main difference is that the reference picture list and index of current PU is given as input. The actual scaling process is the same as that of temporal scaling.

Temporal motion vector candidates are now discussed. Apart for the reference picture index derivation, all processes for the derivation of temporal merge candidates are the same as for the derivation of spatial motion vector candidates as shown in FIG. 14. The reference picture index is signaled to the decoder.

Inter prediction methods beyond HEVC are now discussed. This includes sub-CU based motion vector prediction. In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. An ATMVP method allows each CU to fetch multiple sets of motion information from multiple blocks smaller than the current CU in the collocated reference picture. In a spatial-temporal motion vector prediction (STMVP) method motion vectors of the sub-CUs are derived recursively by using the temporal motion vector predictor and a spatial neighboring motion vector. To preserve a more accurate motion field for sub-CU motion prediction, the motion compression for the reference frames is currently disabled.

Figure 18:
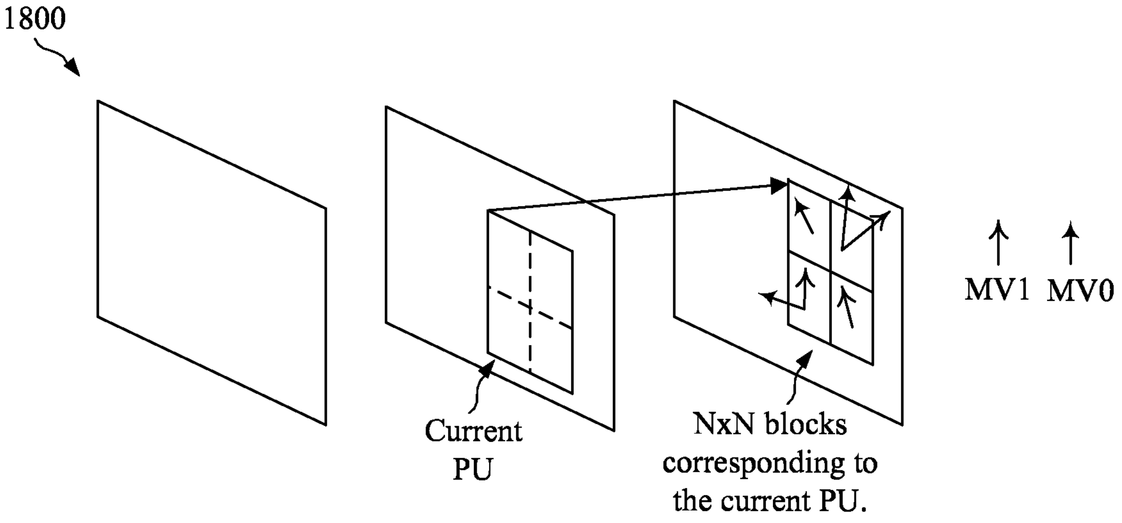
FIG. 18 is a schematic diagram illustrating an example of alternative temporal motion vector prediction (ATMVP) motion prediction for a coding unit (CU).

FIG. 18 is a schematic diagram 1800 illustrating an example of ATMVP motion prediction for a CU. In the ATMVP method, the motion vectors temporal motion vector prediction (TMVP) is modified by fetching multiple sets of motion information from blocks smaller than the current CU. This includes motion vectors and reference indices. As shown in diagram 1800, the sub-CUs are square N×N blocks (N is set to 4 by default). ATMVP predicts the motion vectors of the sub-CUs within a CU in two steps. The first step is to identify the corresponding block in a reference picture with a temporal vector. The reference picture is called the motion source picture. The second step is to split the current CU into sub-CUs and obtain the motion vectors as well as the reference indices of each sub-CU from the block corresponding to each sub-CU as shown in diagram 1800.

In the first step, a reference picture and the corresponding block is determined by the motion information of the spatial neighboring blocks of the current CU, which includes the current PU. To avoid the repetitive scanning process of neighboring blocks, the first merge candidate in the merge candidate list of the current CU is used. The first available motion vector as well as the associated reference index are set to be the temporal vector and the index to the motion source picture. In this way, the corresponding block may be more accurately identified in ATMVP when compared with TMVP. The corresponding block (sometimes called the collocated block) is in a bottom-right or center position relative to the current CU.

In the second step, a corresponding block of the sub-CU is identified by the temporal vector in the motion source picture by adding the coordinate of the current CU to the temporal vector. For each sub-CU, the motion information of a corresponding block (the smallest motion grid that covers the center sample) is used to derive the motion information for the sub-CU. After the motion information of a corresponding N×N block is identified, the motion information is converted to the motion vectors and reference indices of the current sub-CU in the same way as TMVP. Motion scaling and other procedures also apply. For example, the decoder checks whether the low-delay condition is fulfilled. This occurs when the POCs of all reference pictures of the current picture are smaller than the POC of the current picture. The decoder may also use motion vector MVx to predict motion vector MVy for each sub-CU. MVx is the motion vector corresponding to reference picture list X and MVy is the motion vector for picture Y, with X being equal to 0 or 1 and Y being equal to 1−X.

Figure 19:
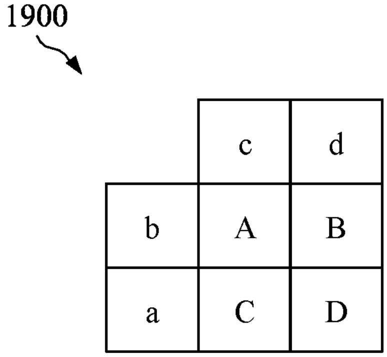
FIG. 19 is a schematic diagram illustrating an example of spatial-temporal motion vector prediction for sub-CUs.

FIG. 19 is a schematic diagram 1900 illustrating an example of spatial-temporal motion vector prediction for sub-CUs. In spatial-temporal motion vector prediction, the motion vectors of the sub-CUs are derived recursively following raster scan order as shown in diagram 1900. As an example, an 8×8 CU may contain four 4×4 sub-CUs denoted as A, B, C, and D. The neighboring 4×4 blocks in the current frame are labelled as a, b, c, and d. The motion derivation for sub-CU A starts by identifying A's two spatial neighbors. The first neighbor is the N×N block above sub-CU A, which includes block c. When block c is not available or is intra coded, the other N×N blocks above sub-CU A are checked from left to right starting at block c. The second neighbor is a block to the left of the sub-CU A, which includes block b. When block b is not available or is intra coded, other blocks to the left of sub-CU A are checked from top to bottom starting at block b. The motion information obtained from the neighboring blocks for each list is scaled to the first reference frame for a given list. Next, the TMVP of sub-block A is derived. The motion information of the collocated block at location D is fetched and scaled accordingly. Finally, after retrieving and scaling the motion information, all available motion vectors (up to three) are averaged separately for each reference list. The averaged motion vector is assigned as the motion vector of the current sub-CU.

Sub-CU motion prediction mode signaling is now discussed. The sub-CU modes are enabled as additional merge candidates and there is no additional syntax element used to signal the modes. Two additional merge candidates are added to the merge candidates list of each CU to represent the ATMVP mode and the STMVP mode. Up to seven merge candidates are used when the sequence parameter set indicates that ATMVP and STMVP are enabled. The encoding logic of the additional merge candidates is the same as for the merge candidates described above. Accordingly, for each CU in a P or B slice, two more RD checks is employed for the two additional merge candidates. In the JEM, all bins of the merge index are context coded by CABAC. In HEVC, only the first bin is context coded and the remaining bins are context bypass coded.

Adaptive motion vector difference resolution is now discussed. In HEVC, motion vector differences (MVDs) between the motion vector and predicted motion vector of a PU are signaled in units of quarter luma samples when use_integer_mv_flag is equal to 0 in the slice header. In the JEM, a locally adaptive motion vector resolution (LAMVR) is employed. In the JEM, MVD can be coded in units of quarter luma samples, integer luma samples, and/or four luma samples. The MVD resolution is controlled at the CU level, and MVD resolution flags are conditionally signaled for each CU that has at least one non-zero MVD component. For a CU that has at least one non-zero MVD component, a first flag is signaled to indicate whether quarter luma sample MV precision is used in the CU. When the first flag indicates that quarter luma sample MV precision is not used (e.g., first flag is equal to one), another flag is signaled to indicate whether integer luma sample MV precision or four luma sample MV precision is used. When the first MVD resolution flag of a CU is zero, or not coded for a CU (e.g., all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU level rate distortion (RD) checks are used to determine which MVD resolution should be used for a CU. The CU level RD check is performed three times for each MVD resolution. To accelerate encoder speed, the following encoding schemes are applied in the JEM. During the RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with inonally invoked. For a CU, when RD cost integer luma sample MVD resolution is much larger than that of quarter luma sample MVD resolution, the RD check of 4 luma sample MVD resolution for the CU is skipped.

Higher motion vector storage accuracy is now discussed. In HEVC, motion vector accuracy is one-quarter pel (one-quarter luma sample and oneteger luma sample and 4 luma sample MVD resolution so that the time-consuming motion estimation process is not duplicated three times. A RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Higher motion vector storage accuracy is now discussed. In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used. SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM. The additional interpolation filters of 1/32 pel fractional positions are derived by using the average of the filters of the two neighboring 1/16 pel fractional positions.

Figure 20:
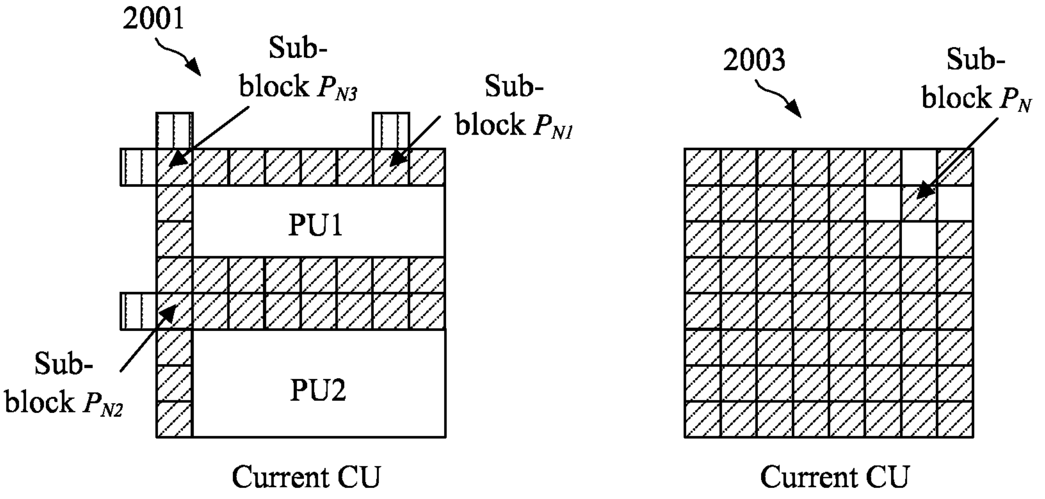
FIG. 20 is a schematic diagram illustrating an example of application of overlapped block motion compensation (OBMC) to sub-blocks.

FIG. 20 is a schematic diagram illustrating an example of application of OMBC to sub-blocks. CU 2001 illustrates application of OMBC for sub-blocks at CU/PU boundaries. CU 2003 illustrates application of OBMC to sub-PUs in ATMVP mode. In the JEM, OBMC can be switched on and off using syntax at the CU level. The diagonal hashing in CU 2001 show sub-blocks when OBMC applies. Accordingly, when OBMC is used in the JEM, the OBMC is performed for all motion compensation (MC) block boundaries except the right and bottom boundaries of a CU. OBMC is applied for both the luma and chroma components. In the JEM, a MC block corresponds to a coding block. When a CU is coded with sub-CU mode, which includes sub-CU merge, affine, and FRUC mode, each sub-block of the CU is a MC block. To process CU boundaries in a uniform fashion, OBMC is performed at sub-block level for all MC block boundaries, where sub-block size is set equal to 4×4 as shown in CU 2001.

When OBMC applies to the current sub-block, motion vectors of up to four connected neighboring sub-blocks are used in addition to the current motion vectors to derive the prediction block for the current sub-block. The four connected neighboring sub-blocks are used when available and when not identical to the current motion vector. The four connected neighboring sub-blocks are illustrated in CU 2001 by vertical hashing. These multiple prediction blocks based on multiple motion vectors are combined to generate the final prediction signal of the current sub-block.

A prediction block based on motion vectors of a neighboring sub-block is denoted as $P_N$, with N indicating an index for the neighboring above, below, left, and/or right sub-block. In the example shown, the motion vector of the above neighboring sub-block is used in OBMC of $P_{N1}$, the motion vector of the left neighboring sub-block is used in OBMC of $P_{N2}$, and the motion vector of the above neighboring sub-block and the left neighboring sub-block are used in OBMC of $P_{N3}$.

A prediction block based on motion vectors of the current sub-block is denoted as $P_C$. When $P_N$ is based on the motion information of a neighboring sub-block that contains the same motion information as the current sub-block, the OBMC is not performed from $P_N$. Otherwise, every sample of $P_N$ is added to the same sample in $P_C$. For example, four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks where height or width of the coding block is equal to 4 or a CU is coded with sub-CU mode. In such case, only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighboring sub-block, samples in the same row (column) of $P_N$ are added to $P_C$ with a same weighting factor. As shown in CU 2003, sub-block $P_N$ is adjacent to four neighboring sub-blocks, which are illustrated without hashing. The motion vectors of four neighboring sub-blocks are used in OBMC for sub-block $P_N$.

In the JEM, a CU level flag is signaled to indicate whether OBMC is applied or not for the current CU when the current CU with size less than or equal to 256 luma samples. For the CUs with a size larger than 256 luma samples or not coded with AMVP mode, OBMC is applied by default. At the encoder, when OBMC is applied for a CU, the impact of OBMC is considered during the motion estimation stage. The prediction signal formed by OBMC using motion information of the top neighboring block and the left neighboring block is used to compensate the top and left boundaries of the original signal of the current CU. The normal motion estimation process is then applied.

Figure 21:
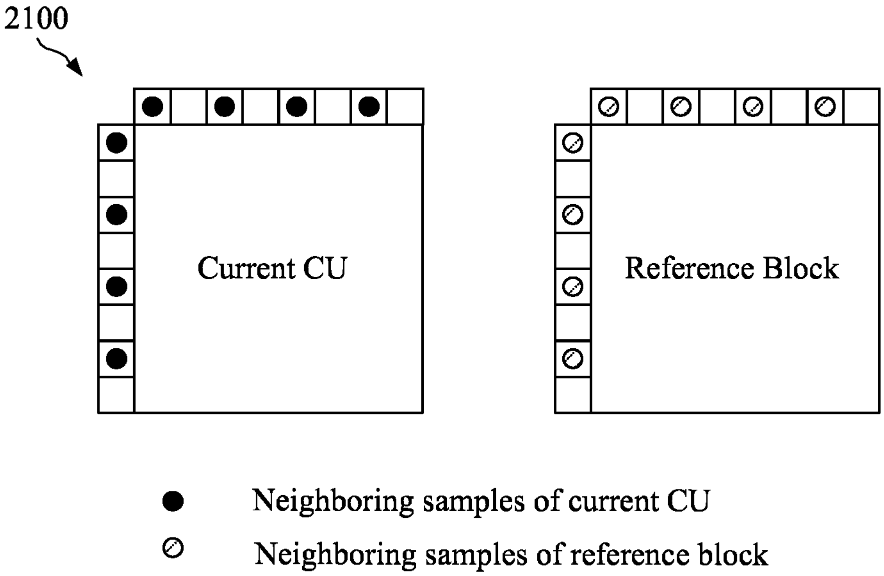
FIG. 21 is a schematic diagram illustrating an example of neighboring samples used for deriving illumination compensation parameters.

FIG. 21 is a schematic diagram 2100 illustrating an example of neighboring samples used for deriving illumination compensation parameters. Local illumination compensation (LIC) is performed based on a linear model for illumination changes using a scaling factor a and an offset b. LIC is enabled or disabled adaptively for each inter-mode coded CU. When LIC applies for a CU, a least square error method is employed to derive the parameters a and b by using the neighboring samples of the current CU and their corresponding reference samples. As shown in diagram 2100, the subsampled (2:1 subsampling) neighboring samples of the CU and the corresponding samples (identified by motion information of the current CU or sub-CU) in the reference picture are used. The illumination compensation (IC) parameters are derived and applied for each prediction direction separately.

When a CU is coded with merge mode, the LIC flag is copied from neighboring blocks, in a manner similar to motion information copy in merge mode. Otherwise, an LIC flag is signaled for the CU to indicate whether LIC applies or not. When LIC is enabled for a picture, an additional CU level RD check is used to determine whether LIC is applied or not for a CU. When LIC is enabled for a CU, a mean-removed sum of absolute difference (MR-SAD) and a mean-removed sum of absolute Hadamard-transformed difference (MR-SATD) are used instead of SAD and sum of absolute transformed difference (SATD) for an integer pel motion search and fractional pel motion search, respectively. To reduce the encoding complexity, the following encoding scheme is applied in the JEM. LIC is disabled for the entire picture when there is no clear illumination change between a current picture and corresponding reference pictures. To identify this situation, histograms of a current picture and every reference picture of the current picture are calculated at the encoder. If the histogram difference between the current picture and every reference picture of the current picture is smaller than a specified threshold, LIC is disabled for the current picture. Otherwise, LIC is enabled for the current picture.

Figure 22:
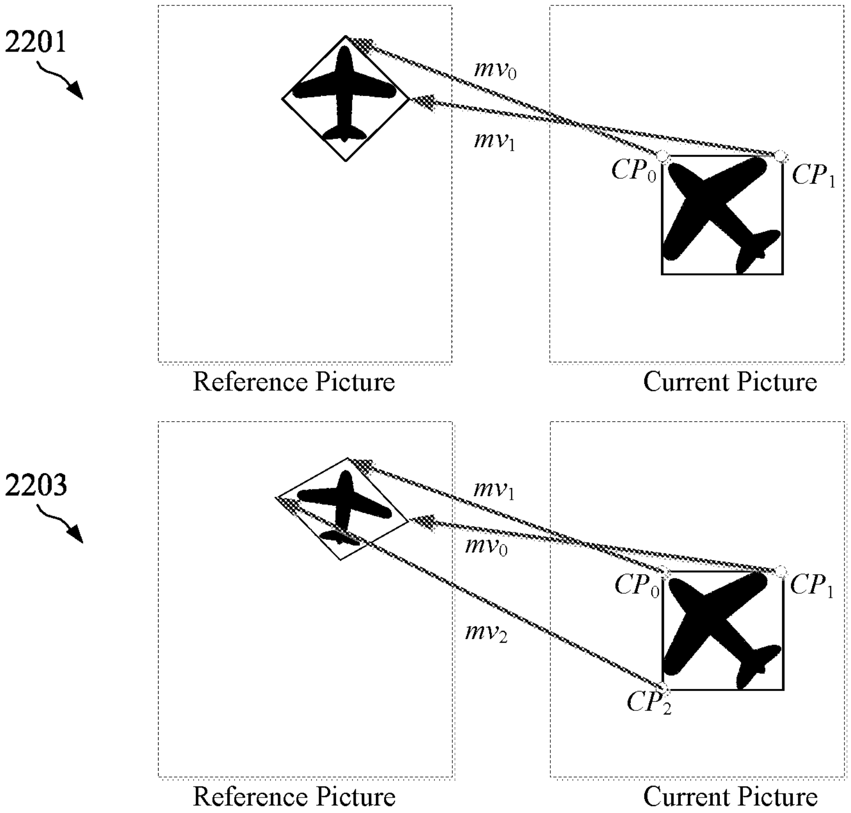
FIG. 22 is a schematic diagram illustrating an example of affine models for affine motion compensation prediction.

FIG. 22 is a schematic diagram illustrating an example of affine models for affine motion compensation prediction. Model 2201 is a four parameter affine model and model 2203 is a six parameter affine model. In HEVC, only the translation motion model is applied for motion compensation prediction (MCP). In the real video, many kinds of motion occur, such as zoom in/out, rotation, perspective motions, and the other irregular motions. In VVC, a simplified affine transform motion compensation prediction is applied. As shown FIG. 22, the affine motion field of the block is described by two control point motion vectors for model 2201 (the 4-parameter affine model) or three control point motion vectors for model 2203 (the 6-parameter affine model).

The motion vector field (MVF) of a block is described by the following equation with the 4-parameter affine model and the 6-parameter affine model respectively:

$$\begin{cases} mv^h(x, y) = ax - by + c = \dfrac{(mv_1^h - mv_0^h)}{w}x + \dfrac{(mv_1^v - mv_0^v)}{h}y + mv_0^h \\ mv^v(x, y) = bx + ay + d = \dfrac{(mv_1^v - mv_0^v)}{w}x + \dfrac{(mv_1^h - mv_0^h)}{h}y + mv_0^v \end{cases} \quad (1)$$

$$\begin{cases} mv^h(x, y) = ax + cy + e = \dfrac{(mv_1^h - mv_0^h)}{w}x + \dfrac{(mv_2^h - mv_0^h)}{h}y + mv_0^h \\ mv^v(x, y) = bx + dy + f = \dfrac{(mv_1^v - mv_0^v)}{w}x + \dfrac{(mv_2^v - mv_0^h)}{h}y + mv_0^v \end{cases} \quad (2)$$

where (mvh0, mvh0) is the motion vector of the top-left corner control point, (mvh1, mvh1) is the motion vector of the top-right corner control point, (mvh2, mvh2) is the motion vector of the bottom-left corner control point, and (x, y) represents the coordinate of a representative point relative to the top-left sample within a current block. The control point (CP) motion vectors may be signaled (like in the affine AMVP mode) or derived on-the-fly (like in the affine merge mode). w and h are the width and height of the current block. In practice, the division is implemented by right-shift with a rounding operation. In VVC test model (VTM), the representative point is defined to be the center position of a sub-block. For example, when the coordinate of the left-top corner of a sub-block relative to the top-left sample within a current block is (xs, ys), the coordinate of the representative point is defined to be (xs+2, ys+2).

In a division-free design, (1) and (2) are implemented as $$\begin{cases} \text{iDMvHorX} = (mv_1^h - mv_0^h) << (S - \log_2(w)) \\ \text{iDMvHorY} = (mv_1^v - mv_0^v) << (S - \log_2(w)) \end{cases} \quad (3)$$

For the 4-parameter affine model shown in (1):

$$\begin{cases} \text{iDMvVerX} = -\text{iDMvHorY} \\ \text{iDMvVerY} = \text{iDMvHorX} \end{cases} \quad (4)$$

For the 6-parameter affine model shown in (2):

$$\begin{cases} \text{iDMvVerX} = (mv_2^h - mv_0^h) << (S - \log_2(h)) \\ \text{iDMvVerY} = (mv_2^v - mv_0^v) << (S - \log_2(h)) \end{cases} \quad (5)$$

Finally, $$\begin{cases} mv^h(x, y) = \text{Normalize}(\text{iDMvHorX} \cdot x + \text{iDMvVerX} \cdot y + (mv_0^h \ll S), S) \\ mv^v(x, y) = \text{Normalize}(\text{iDMvHorY} \cdot x + \text{iDMvVerY} \cdot y + (mv_0^v \ll S), S) \end{cases} \quad (6)$$

$$\text{Normalize}(Z, S) = \begin{cases} (Z + Off) >> S \text{ if } Z \geq 0 \\ -((-Z + Off) >> S) \text{ Otherwise} \end{cases} \quad (7)$$

$$Off = 1 << (S - 1)$$

where S represents the calculation precision. In VVC, S=7. In VVC, the MV used in MC for a sub-block with the top-left sample at (xs, ys) is calculated by (6) with x=xs+2 and y=ys+2.

Figure 23:
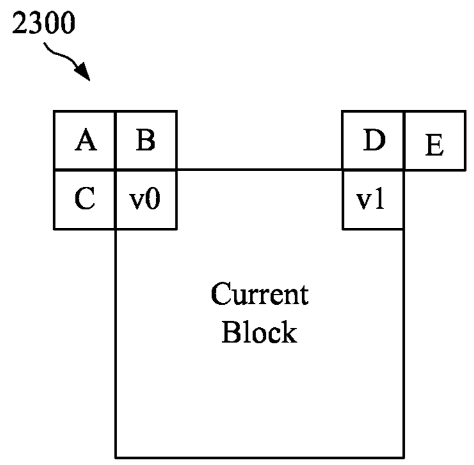
FIG. 23 is a schematic diagram illustrating an example of motion vector prediction for affine inter prediction.

FIG. 23 is a schematic diagram 2300 illustrating an example of motion vector prediction for affine inter prediction. To derive a motion vector of each 4×4 sub-block, the motion vector of the center sample of each sub-block, as shown in diagram 2300, is calculated according to Equation (1) or (2) and rounded to 1/16 fraction accuracy. Then the motion compensation interpolation filters are applied to generate the prediction of each sub-block with derived motion vector. The block is divided into multiple sub-blocks and motion information for each block is derived based on the derived CP MVs of current block.

Figure 24:
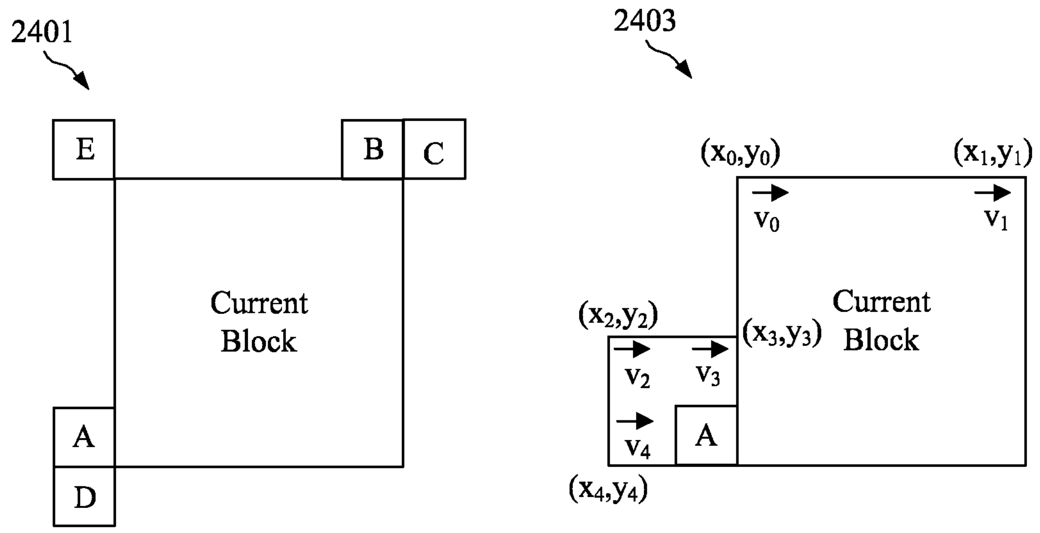
FIG. 24 is a schematic diagram illustrating an example of candidates for affine inter prediction.

FIG. 24 is a schematic diagram 2400 illustrating an example of candidates for affine inter prediction. When a CU is applied in affine merge (AF_MERGE) mode, the first block is coded with affine mode from valid neighbor reconstructed blocks. The selection order for the candidate block is from left, above, above right, left bottom, and above left as shown in block 2401. If the neighbor left bottom block A is coded in affine mode as shown in block 2403, the motion vectors $v_2$, $v_3$, and $v_4$ of the top left corner, above right corner, and left bottom corner of the CU which contains the block A are derived. The motion vector $v_0$ of the top left corner on the current CU is calculated according to $v_2$, $v_3$, and $v_4$. The motion vector $v_1$ of the above right of the current CU is calculated.

After the control point MV (CPMV) of the current CU $v_0$ and $v_1$ are derived, according to the simplified affine motion model Equation 1, the MVF of the current CU is generated. In order to identify whether the current CU is coded with AF_MERGE mode, an affine flag is signaled in the bitstream when there is at least one neighbor block coded in affine mode.

Pattern matched motion vector derivation (PMMVD) mode is a special merge mode based on Frame-Rate Up Conversion (FRUC) techniques. With this mode, motion information of a block is derived at decoder side and not signaled by the encoder. A FRUC flag is signaled for a CU when a merge flag for the CU is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

At encoder side, the decision on whether using FRUC merge mode for a CU is based on RD cost selection in a similar manner as normal merge candidate. The two matching modes (bilateral matching and template matching) are both checked for a CU by using RD cost selection. The one leading to the minimal cost is further compared to other CU modes. If a FRUC matching mode is the most efficient one, a FRUC flag is set to true for the CU and the related matching mode is used.

A motion derivation process in FRUC merge mode has two steps. A CU level motion search is first performed, and then followed by a sub-CU level motion refinement. At the CU level, an initial motion vector is derived for the whole CU based on bilateral matching or template matching. A list of MV candidates is generated, and the candidate which leads to the minimum matching cost is selected as the starting point for further CU level refinement. Then a local search based on bilateral matching or template matching around the starting point is performed. The MV that results in the minimum matching cost is taken as the MV for the whole CU. Subsequently, the motion information is further refined at the sub-CU level with the derived CU motion vectors as the starting points.

For example, the following derivation process is performed for a width (W) times height (H) CU motion information derivation. At the first stage, the MV for the whole W×H CU is derived. At the second stage, the CU is further split into M×M sub-CUs. The value of M is calculated. D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \tag{7}$$

Figure 25:
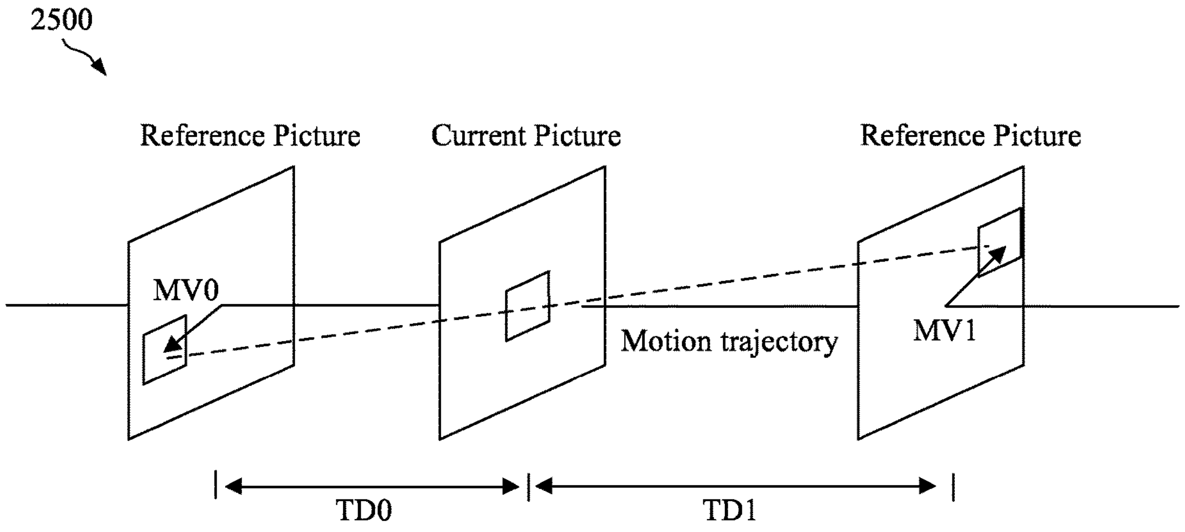
FIG. 25 is a schematic diagram illustrating an example of bilateral matching used in bidirectional inter prediction.

FIG. 25 is a schematic diagram 2500 illustrating an example of bilateral matching used in bidirectional inter prediction. As shown in diagram 2500, bilateral matching is used to derive motion information of the current CU in the current picture by finding the closest match between two blocks along a motion trajectory traversing the current CU when passing between two different reference pictures. Under the assumption of continuous motion trajectory, the motion vectors MV0 and MV1 pointing to the two reference blocks have a length that is proportional to the temporal distances, denoted as TD0 and TD1, between the current picture and the two reference pictures. When the current picture is temporally between the two reference pictures and the temporal distance from the current picture to the two reference pictures is equal, the bilateral matching becomes minor based bi-directional MV.

Figure 26:
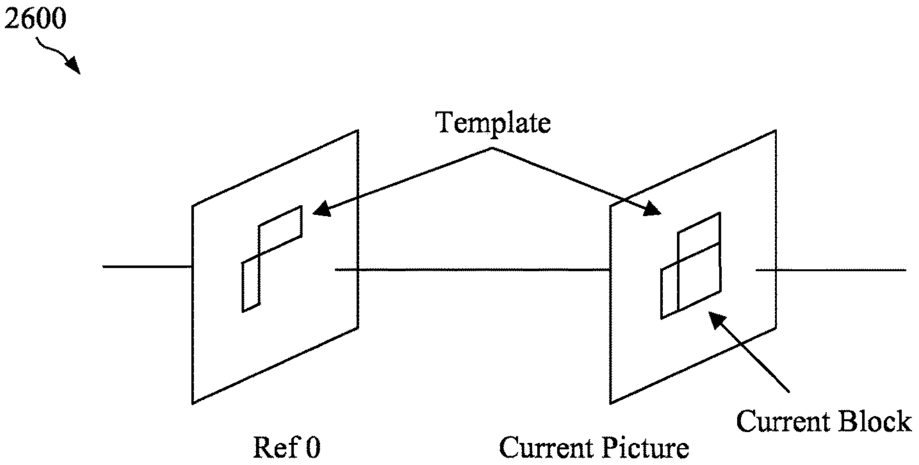
FIG. 26 is a schematic diagram illustrating an example of template matching used in inter prediction.

FIG. 26 is a schematic diagram 2600 illustrating an example of template matching used in inter prediction, in this case unidirectional inter prediction. As shown in diagram 2600, template matching is used to derive motion information of the current CU by finding the closest match between a template (top and/or left neighboring blocks of the current CU) in the current picture and a block (same size to the template) in a reference picture. The template matching is applied to AMVP mode and FRUC merge mode. In the JEM and in HEVC, AMVP has two candidates. A candidate can be derived with template matching. When the candidate derived by template matching is different to the first existing AMVP candidate, the candidate derived by template matching is inserted at the very beginning of the AMVP candidate list. Then the list size is set to two (e.g., to remove the second existing AMVP candidate). When applied to AMVP mode, only CU level search is applied.

A CU level MV candidate set is now discussed. The MV candidate set at the CU level comprises: original AMVP candidates when the current CU is in AMVP mode; all merge candidates; several MVs in the interpolated MV field; and top and left neighboring motion vectors. When using bilateral matching, each valid MV of a merge candidate is used as an input to generate a MV pair with the assumption of bilateral matching. For example, one valid MV of a merge candidate is (MVa, refa) at reference list A. Then the reference picture retb of a paired bilateral MV is found in the other reference list B so that refa and refb are temporally at different sides of the current picture. When such a refb is not available in reference list B, refb is determined as a reference picture which is different from refa and has a temporal distance from the current picture equal to the minimal temporal distance in list B. After refb is determined, MVb is derived by scaling MVa based on the temporal distance between the current picture and refa, refb. Four MVs from the interpolated MV field are also added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. At the CU level, up to 15 MVs for AMVP CUs and up to 13 MVs for merge CUs are added to the candidate list.

A sub-CU level MV candidate set is now discussed. The MV candidate set at sub-CU level comprises: an MV determined from a CU level search; top, left, top-left, and top-right neighboring MVs; scaled versions of collocated MVs from reference pictures; up to 4 ATMVP candidates, and up to 4 STMVP candidates. The scaled MVs from reference pictures are derived as follows. All the reference pictures in both lists are traversed. The MVs at a collocated position of the sub-CU in a reference picture are scaled to the reference of the starting CU level MV. ATMVP and STMVP candidates are limited to the first four candidates derived by ATMVP and STMVP. At the sub-CU level, up to 17 MVs are added to the candidate list.

Figure 27:
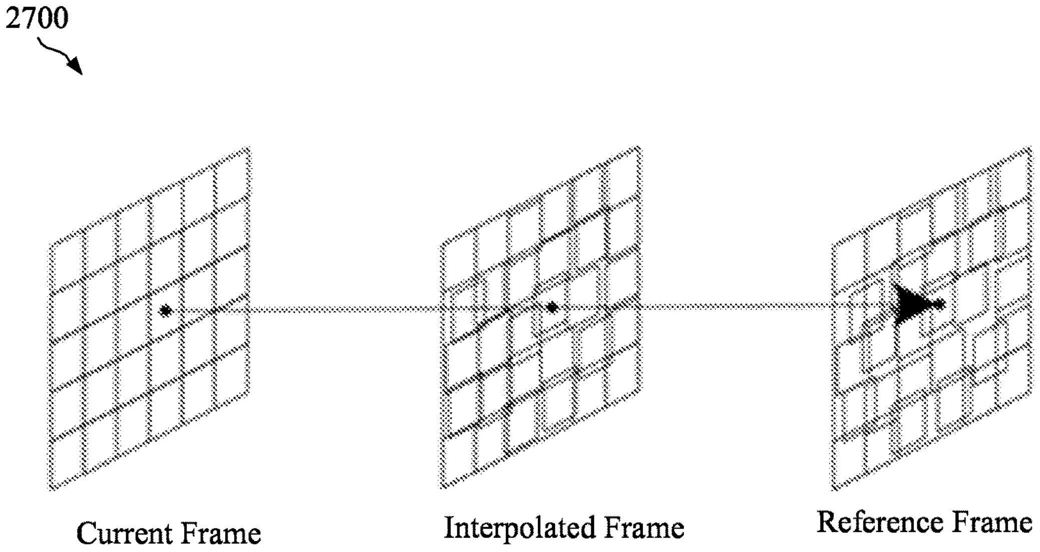
FIG. 27 is a schematic diagram illustrating an example of unilateral motion estimation in Frame-Rate Up Conversion (FRUC).

FIG. 27 is a schematic diagram 2700 illustrating an example of unilateral motion estimation (ME) in FRUC. Generation of an interpolated MV field is now discussed. Before coding a picture, an interpolated motion field is generated for the whole picture based on unilateral ME as shown in diagram 2700. Then the motion field may be used later as CU level or sub-CU level MV candidates.

The motion field of each reference picture in both reference lists is traversed at a 4×4 block level. For each 4×4 block in a reference picture, when the motion associated with the reference block passes through a 4×4 current block in the current picture (as shown in diagram 2700) and when the reference block has not been assigned any interpolated motion, the motion of the reference block is scaled to the current picture according to the temporal distance TD0 and TD1 (the same way as that of MV scaling of TMVP). The scaled motion is assigned to the current block in the current frame. If no scaled MV is assigned to a 4×4 block, the block's motion is marked as unavailable in the interpolated motion field.

Interpolation and matching cost are now discussed. Motion compensated interpolation is employed when a motion vector points to a fractional sample position. To reduce complexity, bi-linear interpolation is used instead of regular 8-tap HEVC interpolation for both bilateral matching and template matching. The calculation of matching cost is a bit different at different steps. When selecting the candidate from the candidate set at the CU level, the matching cost is the sum of absolute difference (SAD) of bilateral matching or template matching. After the starting MV is determined, the matching cost C of bilateral matching at the sub-CU level search is calculated as follows:

$$C = SAD + w \cdot (|MV_x - MV_x^s| + |MV_y - MV_y^s|) \tag{8}$$

where w is a weighting factor which is empirically set to 4, MV and $MV^s$ indicate the current MV and the starting MV, respectively. SAD is used as the matching cost of template matching at sub-CU level search. In FRUC mode, the MV is derived by using luma samples only. The derived motion is used for both luma and chroma for MC inter prediction. After the MV is decided, final motion compensation is performed using an 8-tap interpolation filter for luma and a 4-tap interpolation filter for chroma.

MV refinement is now discussed. MV refinement is a pattern based MV search with the criterion of bilateral matching cost or template matching cost. An unrestricted center-biased diamond search (UCBDS) search pattern and an adaptive cross search pattern for MV refinement at the CU level and sub-CU level are supported in the JEM. For both CU and sub-CU level MV refinement, the MV is directly searched at quarter luma sample MV accuracy. This is followed by one-eighth luma sample MV refinement. The search range of MV refinement for the CU and sub-CU step are set equal to 8 luma samples.

The selection of prediction direction in template matching FRUC merge mode is now discussed. In the bilateral matching merge mode, bi-prediction is always applied. This is because the motion information of a CU is derived based on the closest match between two blocks along the motion trajectory of the current CU in two different reference pictures. There is no such limitation for the template matching merge mode. In the template matching merge mode, the encoder can choose among unidirectional inter prediction from list0, uni directional inter prediction from list1, and bidirectional inter prediction for a CU. The selection is based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

where cost0 is the SAD of list0 template matching, cost1 is the SAD of list1 template matching, and costBi is the SAD of bi-prediction template matching. The value of factor is equal to 1.25, which biases the selection process is toward bi-prediction. The inter prediction direction selection is only applied to the CU level template matching process.

Generalized Bi-prediction Improvement (GBi) is employed in VTM version three (VTM-3.0) and in benchmark set version 2.1 (BMS2.1). GBi may apply unequal weights to predictors from L0 and L1 in bi-prediction mode. In inter prediction mode, multiple weight pairs including the equal weight pair (1/2, 1/2) are evaluated based on rate-distortion optimization (RDO). The GBi index of the selected weight pair is signaled to the decoder. In merge mode, the GBi index is inherited from a neighboring CU. In BMS2.1 GBi, the predictor generation in bi-prediction mode is shown in Equation (9).

$$PGBi = (w0 * PL0 + w1 * PL1 + RoundingOffsetGBi) >> shiftNumGBi, \tag{9}$$

where PGBi is the final predictor of GBi. w0 and w1 are the selected GBi weight pair and applied to the predictors of lists L0 and L1, respectively. RoundingOffsetGBi and shiftNumGBi are used to normalize the final predictor in GBi. The supported w1 weight set is {−1/4, 3/8, 1/2, 5/8, 5/4}, in which the five weights correspond to one equal weight pair and four unequal weight pairs. The blending gain is the sum of w1 and w0, and is fixed to 1.0. Therefore, the corresponding w0 weight set is {5/4, 5/8, 1/2, 3/8, −1/4}. The weight pair selection is at CU level.

For non-low delay pictures, the weight set size is reduced from five to three, where the wl weight set is {3/8, 1/2, 5/8} and the w0 weight set is {5/8, 1/2, 3/8}. The weight set size reduction for non-low delay pictures is applied to the BMS2.1 GBi and all the GBi tests in this disclosure.

An example GBi encoder bug fix is now described. To reduce the GBi encoding time, the encoder may store unidirectional inter prediction (uni-prediction) motion vectors estimated from a GBi weight equal to 4/8. The encoder can then reuse the motion vectors for a uni-prediction search of other GBi weights. This fast encoding method can be applied to both translation motion model and affine motion model. In VTM version 2 (VTM-2.0), a 6-parameter affine model and a 4-parameter affine model are employed. A BMS2.1 encoder may not differentiate the 4-parameter affine model and the 6-parameter affine model when the encoder stores the uni-prediction affine MVs and when GBi weight is equal to 4/8. Consequently, 4-parameter affine MVs may be overwritten by 6-parameter affine MVs after the encoding with GBi weight 4/8. The stored 6-parmater affine MVs may be used for 4-parameter affine ME for other GBi weights, or the stored 4-parameter affine MVs may be used for 6-parameter affine ME. The GBi encoder bug fix is to separate the 4-parameter and the 6-parameter affine MVs storage. The encoder stores those affine MVs based on affine model type when GBi weight is equal to 4/8. The encoder then reuses the corresponding affine MVs based on the affine model type for other GBi weights.

GBi encoder speed-up mechanisms are now described. Five example encoder speed-up methods are proposed to reduce the encoding time when GBi is enabled. A first method includes conditionally skipping affine motion estimation for some GBi weights. In BMS2.1, an affine ME including a 4-parameter and a 6-parameter affine ME is performed for all GBi weights. In an example an affine ME can be conditionally skipped for unequal GBi weights (e.g., weights unequal to 4/8). For example, an affine ME can be performed for other GBi weights if and only if the affine mode is selected as the current best mode and the mode is not affine merge mode after evaluating the GBi weight of 4/8. When the current picture is non-low-delay picture, the bi-prediction ME for the translation model is skipped for unequal GBi weights when affine ME is performed. When the affine mode is not selected as the current best mode or when the affine merge is selected as the current best mode, affine ME is skipped for all other GBi weights.

A second method includes reducing the number of weights for RD cost checking for low-delay pictures in the encoding for 1-pel and 4-pel MVD precision. For low-delay pictures, there are five weights for RD cost checking for all MVD precisions including 1/4-pel, 1-pel and 4-pel. The encoder checks the RD cost for 1/4-pel MVD precision first. A portion of GBi weights can be skipped for RD cost checking for 1-pel and 4-pel MVD precisions. Unequal weights can be ordered according to their RD cost in 1/4-pel MVD precision. Only the first two weights with the smallest RD costs, together with GBi weight 4/8, are evaluated during the encoding in 1-pel and 4-pel MVD precisions. Therefore, three weights at most are evaluated for 1-pel and 4-pel MVD precisions for low delay pictures.

A third method includes conditionally skipping a bi-prediction search when the L0 and L1 reference pictures are the same. For some pictures in random access (RA), the same picture may occur in both reference picture is (L0 and L1). For example, for random access coding configuration in common test conditions (CTC), the reference picture structure for the first group of pictures (GOP) is listed as follows.

POC: 16, TL:0, [L0:0] [L1:0]

POC: 8, TL:1, [L0:0 16] [L1:16 0]

POC: 4, TL:2, [L0:0 8] [L1:8 16]

POC: 2, TL:3, [L0:0 4] [L1:4 8]

POC: 1, TL:4, [L0:0 2] [L1:2 4]

POC: 3, TL:4, [L0:2 0] [L1:4 8]

POC: 6, TL:3, [L0:4 0] [L1:8 16]

POC: 5, TL:4, [L0:4 0] [L1:6 8]

POC: 7, TL:4, [L0:6 4] [L1:8 16]

POC: 12, TL:2, [L0:8 0] [L1:16 8]

POC: 10, TL:3, [L0:8 0] [L1:12 16]

POC: 9, TL:4, [L0:8 0] [L1:10 12]

POC: 11, TL:4, [L0:10 8] [L1:12 16]

POC: 14, TL:3, [L0:12 8] [L1:12 16]

POC: 13, TL:4, [L012 8] [L1:14 16]

POC: 15, TL:4, [L0: 14 12] [L1:16 14]

In this example, pictures 16, 8, 4, 2, 1, 12, 14, and 15 have the same reference picture(s) in both lists. For bi-prediction for these pictures, the L0 and L1 reference pictures may be the same. Accordingly, the encoder may skip bi-prediction ME for unequal GBi weights when two reference pictures in bi-prediction are the same, when the temporal layer is greater than 1, and when the MVD precision is 1/4-pel. For affine bi-prediction ME, this fast skipping method is only applied to 4-parameter affine ME.

A fourth method includes skipping RD cost checking for unequal GBi weights based on temporal layer and the POC distance between the reference picture and the current picture. The RD cost evaluations for those unequal GBi weights can be skipped when the temporal layer is equal to 4 (e.g., the highest temporal layer in RA) or when the POC distance between reference picture (either L0 or L1), the current picture is equal to 1, and coding QP is greater than 32.

A fifth method includes changing the floating-point calculation to a fixed-point calculation for unequal GBi weight during ME. For a bi-prediction search, the encoder may fix the MV of one list and refine the MV in another list. The target is modified before ME to reduce the computation complexity. For example, if the MV of L1 is fixed and the encoder is to refine the MV of L0, the target for L0 MV refinement can be modified with equation 10. O is original signal and $P_1$ is the prediction signal of L1. w is GBi weight for L1.

$$T = ((O \ll 3) - w * P_1) * (1/(8 - w)) \quad (10)$$

The term (1/(8−w)) is stored in floating point precision, which increases computation complexity. The fifth method changes Equation 10 to a fixed-point value as in Equation 11.

$$T = (O * a_1 - P_1 * a_2 + \text{round}) \gg N \quad (11)$$

In Equation 11, a1 and a2 are scaling factors and they are calculated as:

$$\gamma = (1 \ll N)/(8 - w);\ a_1 = \gamma \ll 3;\ a_2 = \gamma * w;\ \text{round} = 1 \ll (N - 1)$$

CU size constraints for GBi are now discussed. In this example, GBi is disabled for small CUs. In inter prediction mode, if bi-prediction is used and the CU area is smaller than 128 luma samples, GBi is disabled without any signaling.

Figure 28:
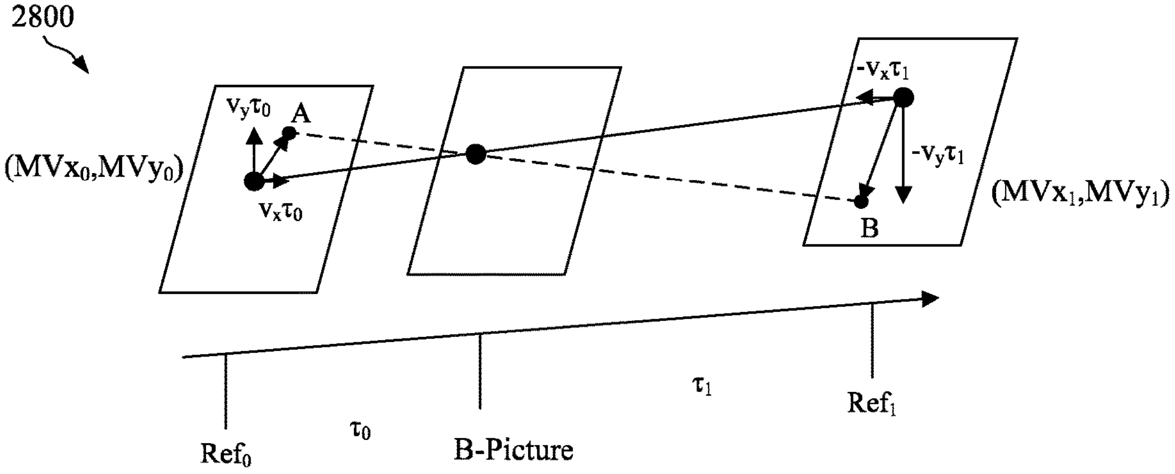
FIG. 28 is a schematic diagram illustrating an example of bidirectional optical flow trajectory.

FIG. 28 is a schematic diagram 2800 illustrating an example of bidirectional optical flow trajectory. Bi-directional optical flow (MO) may also be referred to as BDOF. In BIO, motion compensation is first performed to generate the first predictions of the current block in each prediction direction. The first predictions are used to derive the spatial gradient, the temporal gradient, and the optical flow of each subblock/pixel within the block. These items are then used to generate the second prediction, which acts as the final prediction of the subblock/pixel. The details are described as follows. BIO is sample-wise motion refinement, which is performed in addition to block-wise motion compensation for bidirectional inter prediction (bi-prediction). The sample-level motion refinement may not use signaling.

$I^{(k)}$ may be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by $$\partial I^{(k)}/\partial t + v_x \partial I^{(k)}/\partial x + v_y \partial I^{(k)}/\partial y = 0. \quad (12)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO} = 1/2 \cdot \left(I^{(0)} + I^{(1)} + v_x/2 \cdot \left(\tau_1 \partial I^{(1)}/\partial x - \tau_0 \partial I^{(0)}/\partial x\right) + v_y/2 \cdot \left(\tau_1 \partial I^{(1)}/\partial y - \tau_0 \partial I^{(0)}/\partial y\right)\right). \quad (13)$$

Here, $\tau_0$ and $\tau_1$ denote the distances to the reference frames as shown in diagram 2800. Distances $\tau_0$ and $\tau_1$ are calculated based on the POC for Ref0 and Ref1: τ0=POC (current)−POC(Ref0), $\tau1$=POC(Ref1)−POC(current). When both predictions come from the same time direction (either both from previous pictures or both from subsequent pictures) then the signs are different ($\tau_0 \cdot \tau_1 < 0$). In this case, BIO is applied only when the prediction is not from the same time moment (e.g., $\tau_0 \neq \tau_1$), when both referenced regions have non-zero motion ($MVx_0, MVy_0, MVx_1, MVy_1 \neq 0$), and when the block motion vectors are proportional to the time distance ($MVx_0/MVx_1 = MVy_0/MVy_1 = -\tau_0/\tau_1$).

The motion vector field ($v_x$, $v_y$) is determined by minimizing the difference $\Delta$ between values in points A and B (intersection of motion trajectory and reference frame planes on diagram 2800). The model uses only the first linear term of a local Taylor expansion for $\Delta$:

$$\Delta = \left(I^{(0)} - I^{(1)} + v_x\left(\tau_1 \partial I^{(1)}/\partial x + \tau_0 \partial I^{(0)}/\partial x\right) + v_y\left(\tau_1 \partial I^{(1)}/\partial y + \tau_0 \partial I^{(0)}/\partial y\right)\right) \tag{14}$$

All values in Equation (14) depend on the sample location (i', j'), which was omitted from the notation so far. Assuming the motion is consistent in the local surrounding area, A is minimized inside the (2M+1)×(2M+1) square window $\Omega$ centered on the currently predicted point (i,j), where M is equal to 2:

$$(v_x, v_y) = \underset{v_x, v_y}{\operatorname{argmin}} \sum_{[i',j] \in \Omega} \Delta^2[i', j'] \tag{15}$$

For this optimization problem, the JEM may use a simplified approach making first a minimization in the vertical direction and then in the horizontal direction. This results in $$v_x = (s_1 + r) > m ? clip3\left(-thBIO, thBIO, -\frac{s_3}{(s_1 + r)}\right) : 0 \tag{16}$$

$$v_y = (s_5 + r) > m ? clip3\left(-thBIO, thBIO, -\frac{s_6 - v_x s_2/2}{(s_5 + r)}\right) : 0 \text{ where,} \tag{17}$$

$$s_1 = \sum_{[i',j] \in \Omega} \left(\tau_1 \partial I^{(1)}/\partial x + \tau_0 \partial I^{(0)}/\partial x\right)^2; \tag{18}$$

$$s_3 = \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j] \in \Omega} \left(\tau_1 \partial I^{(1)}/\partial y + \tau_0 \partial I^{(0)}/\partial y\right)^2;$$

$$s_6 = \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Equations (19) and (20).

$$r = 500 \cdot 4^{d-8} \tag{19}$$

$$m = 700 \cdot 4^{d-8} \tag{20}$$

Here d is bit depth of the video samples.

Figure 29:
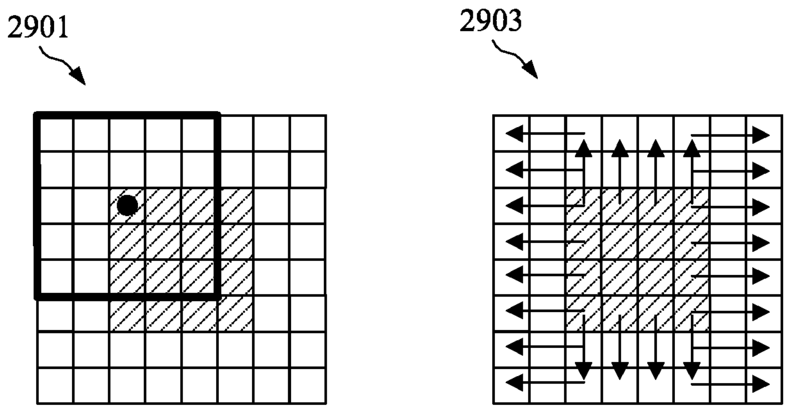
FIG. 29 is a schematic diagram illustrating an example of Bi-directional optical flow (BIO) without a block extension.

FIG. 29 is a schematic diagram illustrating an example of BIO without a block extension. In order to keep the memory access for BIO similar to bi-predictive motion compensation, all prediction and gradients values, $I^{(k)}$, $\partial I^{(k)}/\partial x$, $\partial I^{(k)}/\partial y$, are calculated only for positions inside the current block. In Equation (18), a (2M+1)×(2M+1) square window $\Omega$ centered in a currently predicted point on a boundary of a predicted block should access positions outside of the block as shown in block 2901. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in block 2903. In block 2903, padding is used in order to avoid extra memory access and calculation.

With BIO, a motion field can be refined for each sample. To reduce the computational complexity, a block-based design of BIO is used in the JEM. The motion refinement is calculated based on 4×4 block. In the block-based BIO, the values of $s_n$, in Equation (18) of all samples in a 4×4 block are aggregated. Then the aggregated values of $s_n$, are used to derived BIO motion vectors offset for the 4×4 block. More specifically, the following formula is used for block-based BIO derivation:

$$s_{1,b_k} = \sum_{(x,y) \in b_k} \sum_{[i',j] \in \Omega(x,y)} \left(\tau_1 \partial I^{(1)}/\partial x + \tau_0 \partial I^{(0)}/\partial x\right)^2; \tag{21}$$

$$s_{3,b_k} = \sum_{(x,y) \in b_k} \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y) \in b_k} \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y) \in b_k} \sum_{[i',j] \in \Omega} \left(\tau_1 \partial I^{(1)}/\partial y + \tau_0 \partial I^{(0)}/\partial y\right)^2;$$

$$s_{6,b_k} = \sum_{(x,y) \in b_k} \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples in the k-th 4×4 block of the predicted block. $s_n$ in Equations (16) and (17) are replaced by ((sn,bk)>>4) to derive the associated motion vector offsets.

In some examples, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, the value of the threshold is set to $12 \times 2^{13-d}$.

Gradients for BIO may be calculated at the same time as motion compensation interpolation using operations consistent with HEVC motion compensation process. This may include usage of a two-dimensional (2D) separable finite impulse response (FIR) filter. The input for this 2D separable FIR is the same reference frame sample as for motion compensation process with a fractional position (fracX, fracY) according to the fractional part of the block motion vector. In the case of a horizontal gradient $\partial I/\partial x$, an interpolation BIO filter for prediction signal (BIOfilterS) is applied in a vertical direction corresponding to the fractional position fracY with a de-scaling shift d−8. Then a gradient BIO filter (BIOfilterG) is applied in a horizontal direction corresponding to the fractional position fracX with a de-scaling shift by 18−d. In case of vertical gradient $\partial I/\partial y$ a first gradient filter is applied vertically using BIOfilterG corresponding to the fractional position fracY with de-scaling shift d−8. Then a signal displacement is performed using BIOfilterS in a horizontal direction corresponding to the fractional position fracX with de-scaling shift by 18−d. The length of the interpolation filter for gradient calculation BIOfilterG and BIO signal displacement (BIOfilterF) is shorter (6-tap) in order to maintain reasonable complexity. Table 1 shows the filters used for a gradient calculation for different fractional positions of motion vectors for a block in BIO.

TABLE 1

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

Table 2 shows the interpolation filters used for prediction signal generation in BIO.

TABLE 2

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO is applied to all bi-predicted blocks when the two predictions are from different reference pictures. BIO is disabled when LIC is enabled for a CU. In the JEM, OBMC is applied for a block after the MC process. To reduce the computational complexity, BIO is not applied during the OBMC process. This means that BIO is only applied in the MC process for a block when using the blocks own MV and is not applied in the MC process when the MV of a neighboring block is used during the OBMC process.

Figure 30:
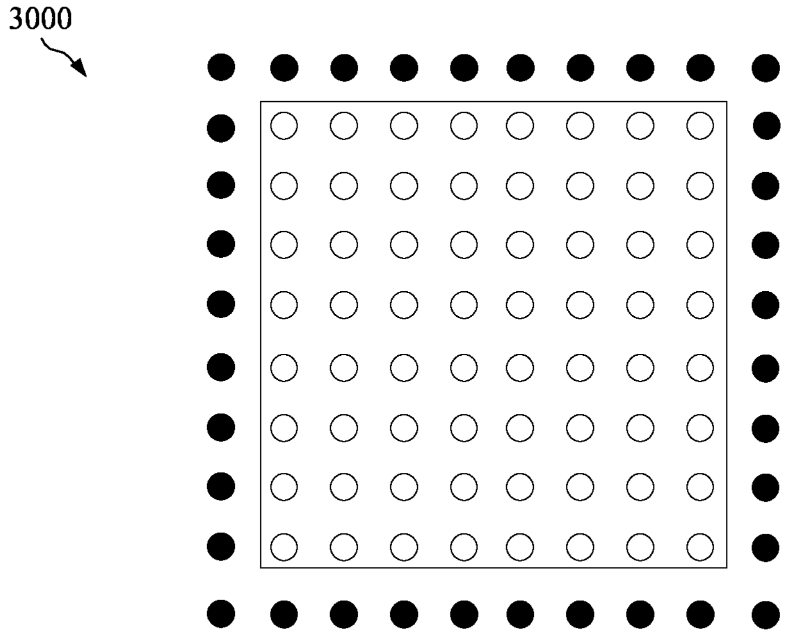
FIG. 30 is a schematic diagram illustrating an example of interpolated samples used in BIO.

FIG. 30 is a schematic diagram 3000 illustrating an example of interpolated samples used in BIO, for example as used in VTM-3.0. In an example, BIO employs a first step to judge whether BIO is applicable. W and H are a width and a height, respectively, of a current block. BIO is not applicable when the current block is affine coded, when the current block is ATMVP coded, when (iPOC−iPOC0)*(iPOC−iPOC1)>=0, when H==4 or (W==4 and H==8), when the current block uses weighted prediction, and when GBi weights are not (1,1). BIO is also not used when total SAD between the two reference blocks (denoted as R0 and R1) is smaller than a threshold.

$$SAD = \sum_{(xy)} |R0(x, y) - R1(x, y)|$$

In an example, BIO employs a second step that includes data preparation. For a W×H block, (W+2)×(H+2) samples are interpolated. The inner W×H samples are interpolated with the 8-tap interpolation filter as in motion compensation. The four side outer lines of samples, illustrated as black circles in diagram 3000, are interpolated with the bi-linear filter. For each position, gradients are calculated on the two reference blocks (denoted as R0 and R1).

$$Gx0(x, y) = (R0(x+1, y) - R0(x-1, y)) >> 4$$

$$Gy0(x, y) = (R0(x, y+1) - R0(x, y-1)) >> 4$$

$$Gx1(x, y) = (R1(x+1, y) - R1(x-1, y)) >> 4$$

$$Gy1(x, y) = (R1(x, y+1) - R1(x, y-1)) >> 4$$

For each position, internal values are calculated as:

$T1=(R0(x,y)>>6)-(R1(x,y)>>6)$, $T2=(Gx0(x,y)+Gx1(x,y))>>3$, $T3=(Gy0(x,y)+Gy1(x,y))>>3$ $B1(x,y)=T2*T2$, $B2(x,y)=T2*T3$, $B3(x,y)=-T1*T2$, $B5(x,y)=T3*T3$, $B6(x,y)=-T1*T3$

In an example, BIO employs a second step that includes calculating a prediction for each block. BIO is skipped for a 4×4 block if SAD between the two 4×4 reference blocks is smaller than a threshold. Vx and Vy are calculated. The final prediction for each position in the 4×4 block is also calculated.

$$b(x, y) = (Vx(Gx0(x, y) - Gx1(x, y)) + Vy(Gy0(x, y) - Gy1(x, y)) + 1) >> 1$$

$$P(x, y) = (R0(x, y) + R1(x, y) + b(x, y) + \text{offset}) >> \text{shift}$$

b(x,y) is known as a correction item.

BIO in VTM version four (VTM-4.0), rounds the results of calculation in BDOF depending on bit-depth. VTM-4.0 also removed the bi-linear filtering and fetches the nearest integer pixel of the reference block to pad the four side outer lines of samples (black circles in diagram 3000).

Figure 31:
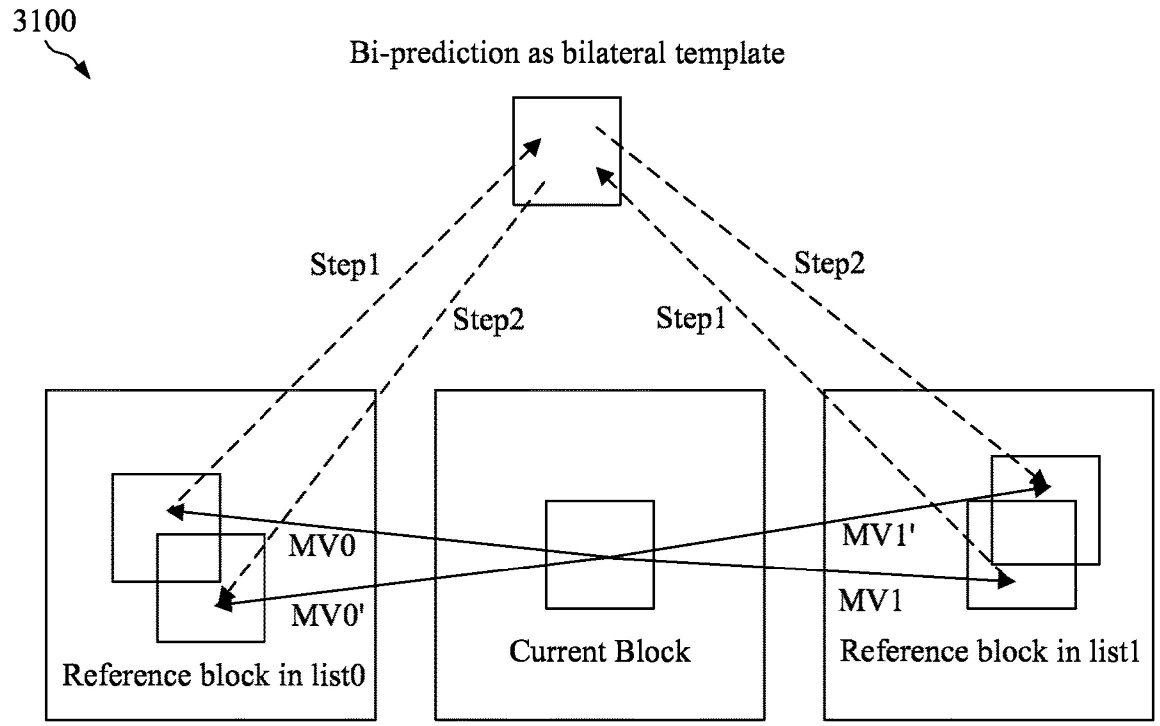
FIG. 31 is a schematic diagram illustrating an example of decoder-side motion vector refinement (DMVR) based on bilateral template matching.

FIG. 31 is a schematic diagram 3100 illustrating an example of decoder-side motion vector refinement (DMVR) based on bilateral template matching. DMVR is a type of Decoder-side Motion Vector Derivation (DMVD). In a bi-prediction operation for the prediction of one block region, two prediction blocks, formed using a MV of list0 and a MV of list1, respectively, are combined to form a single prediction signal. In DMVR, the two motion vectors of the bi-prediction are further refined by a bilateral template matching process. The bilateral template matching is applied in the decoder to perform a distortion-based search between a bilateral template and the reconstruction samples in the reference pictures in order to obtain a refined MV without transmission of additional motion information.

In DMVR, a bilateral template is generated as the weighted combination (e.g., average) of the two prediction blocks, from the initial MV0 of list0 and MV1 of list 1, respectively, as shown in diagram 3100. The template matching operation includes calculating cost measures between the generated template and the sample region around the initial prediction block in the reference picture. For each of the two reference pictures, the MV that yields the minimum template cost is considered as the updated MV of that list to replace the original MV. In the JEM, nine MV candidates are searched for each list. The nine MV candidates include the original MV and eight MVs with one luma sample offset from the original MV in the horizontal direction, the vertical direction, or both. The two new MVs, denoted as MV0' and MV1' as shown in diagram 3100, are used for generating the final bi-prediction results. A SAD is used as a cost measure. When calculating the cost of a prediction block generated by one surrounding MV, the rounded MV (to integer pel) is actually used to obtain the prediction block instead of the real MV.

DMVR is applied for the merge mode of bi-prediction with one MV from a preceding reference picture and another from a subsequent reference picture without the transmission of additional syntax elements. In the JEM, DMVR is not applied when a LIC candidate, an affine motion candidate, a FRUC candidate, and/or a sub-CU merge candidate is enabled for a CU.

Template matching based adaptive merge candidate reorder is now discussed. To improve coding efficiency, the order of each merge candidate is adjusted according to the template matching cost after the merge candidate list is constructed. The merge candidates are arranged in the list in accordance with the template matching cost of ascending order. Related operations are performed in the form of a sub-group.

Figure 32:
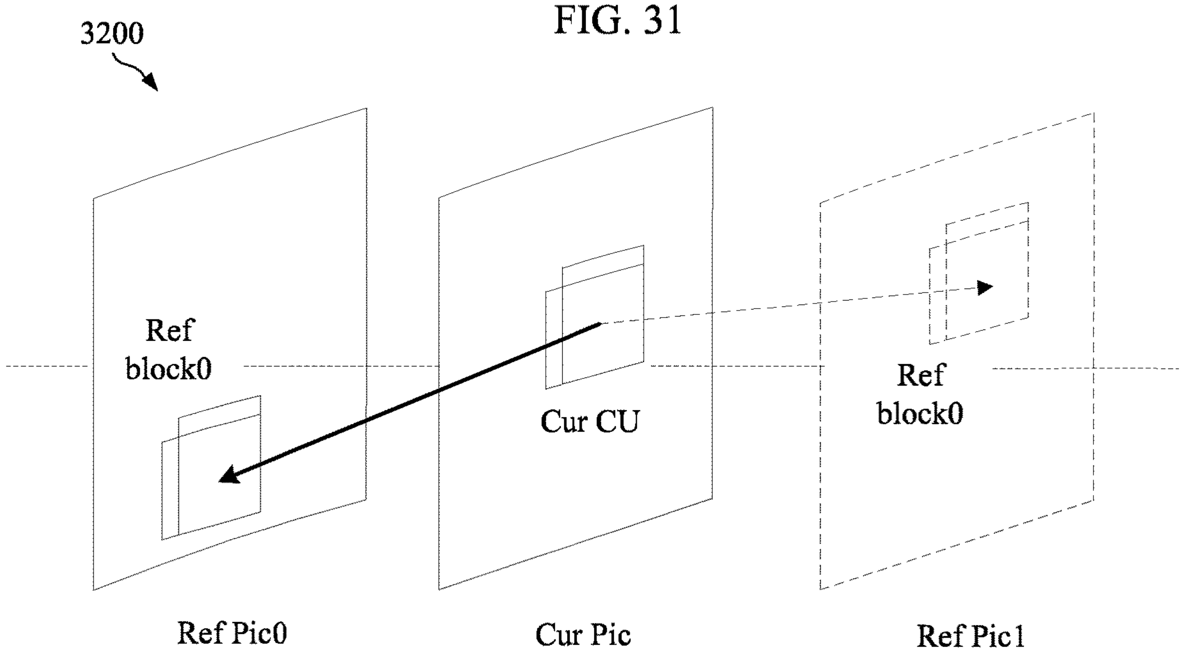
FIG. 32 is a schematic diagram illustrating an example of neighboring samples used for calculating sum of absolute difference (SAD) in template matching.

FIG. 32 is a schematic diagram 3200 illustrating an example of neighboring samples used for calculating SAD in template matching. The template matching cost is measured by the SAD between the neighboring samples of the current CU and their corresponding reference samples. When a merge candidate includes bi-predictive motion information, the corresponding reference samples are the average of the corresponding reference samples in reference list0 and the corresponding reference samples in reference listl, as illustrated in diagram 3200.

Figure 33:
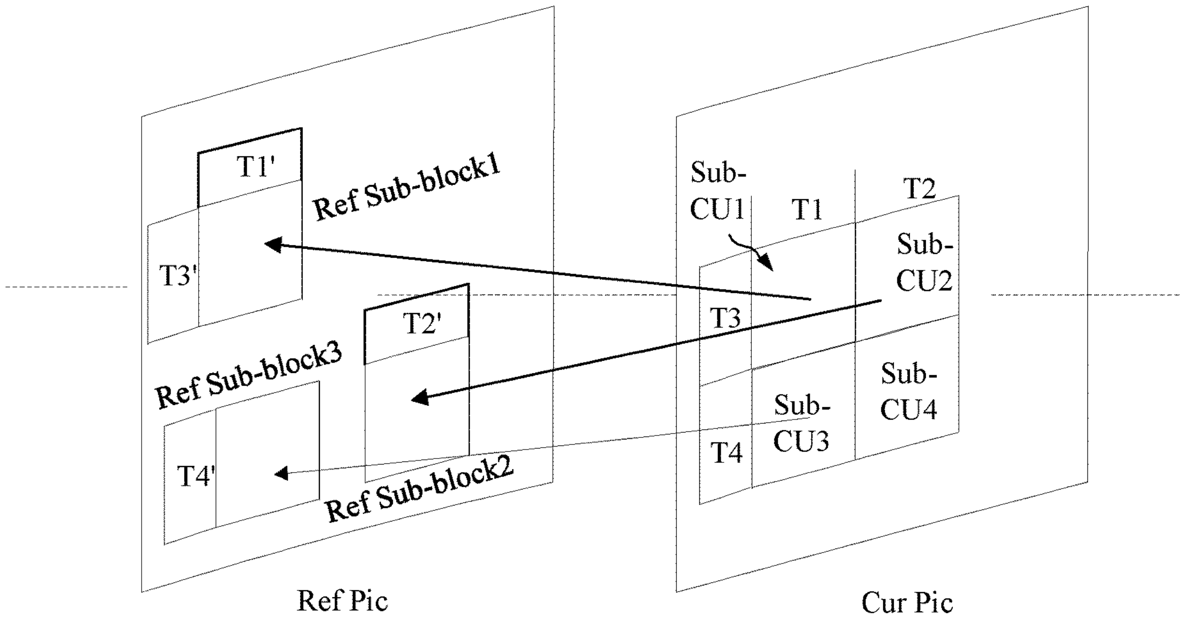
FIG. 33 is a schematic diagram illustrating an example of neighboring samples used for calculating SAD for sub-coding unit (CU) level motion information in template matching.

FIG. 33 is a schematic diagram 3300 illustrating an example of neighboring samples used for calculating SAD for sub-CU level motion information in template matching. If a merge candidate includes sub-CU level motion information, the corresponding reference samples include the neighboring samples of the corresponding reference sub-blocks, as illustrated in diagram 3300.

Figure 34:
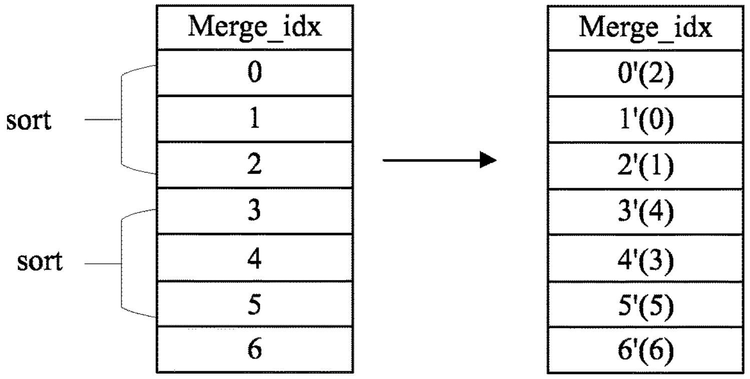
FIG. 34 is a schematic diagram illustrating an example of a sorting process used in updating a merge candidate list.

FIG. 34 is a schematic diagram 3400 illustrating an example of a sorting process used in updating a merge candidate list. The sorting process is operated in the form of sub-group, as illustrated in diagram 3400. The first three merge candidates are sorted together. The following three merge candidates are sorted together. The template size (width of the left template or height of the above template) is 1. The sub-group size is 3.

Figure 35:
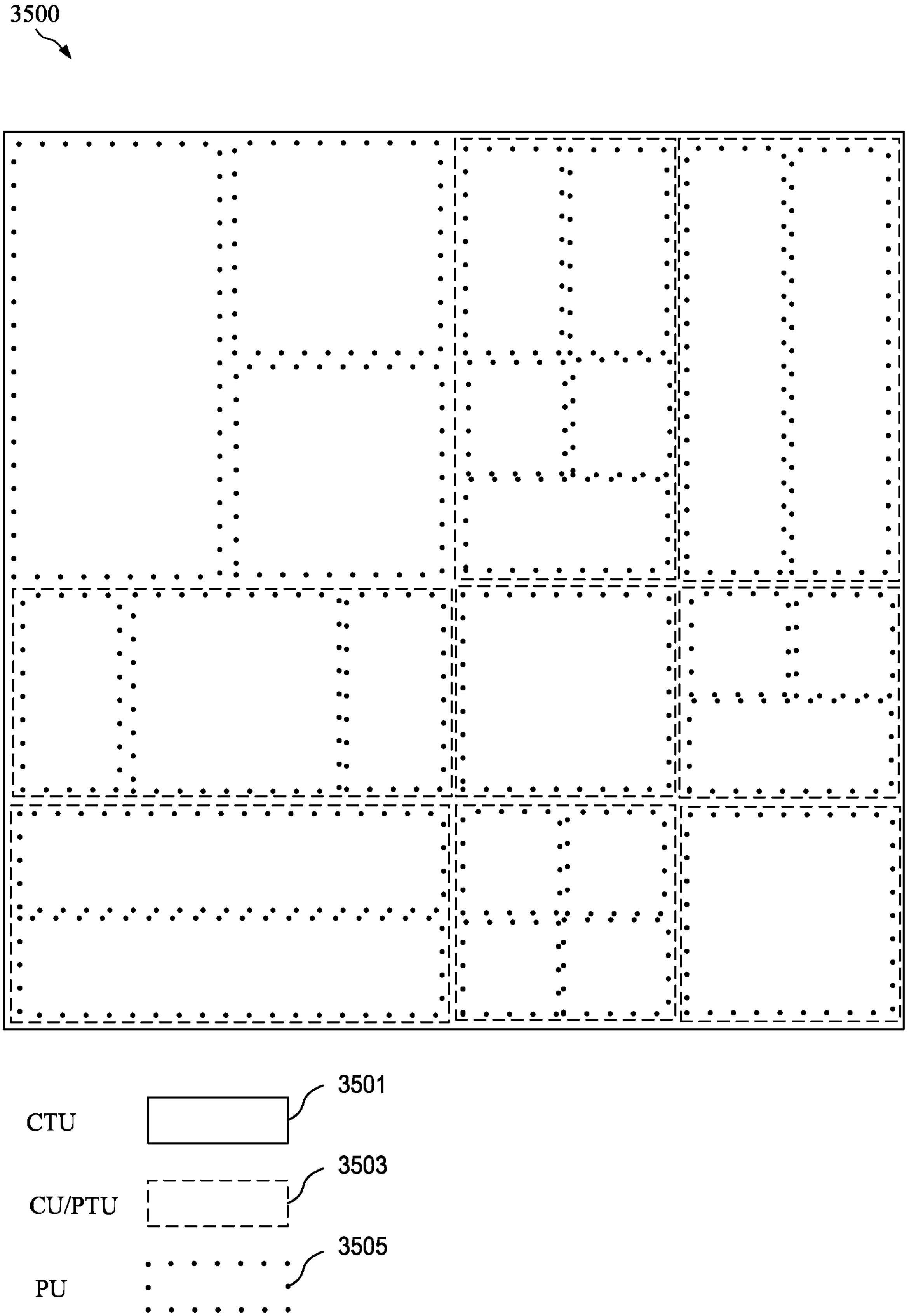
FIG. 35 is a schematic diagram of an example coding tree unit (CTU) split by a recursive PUs.

FIG. 35 is a schematic diagram 3500 of an example CTU 3501 split by a recursive PUs 3505. A picture can be split into rows and columns of CTUs. In schematic diagram 3500, the CTU is depicted by a solid line. A CTU 3501 is a block of luma samples, denoted as Y samples, and corresponding chroma samples. The chroma samples include blue difference (Cb) samples and red difference (Cr) samples. Types of samples may also be referred to as components, such as a luma component, Cr component, Cb component, etc. The CTU 3501 is a predetermined size block. For example, a CTU 3501 can be between 16×16 pixels and 64×64 pixels, depending on the example. A CTU 3501 may be created in a first pass when partitioning the picture, and hence a CTU 3501 may be referred to as the largest coding unit in a picture.

A CTU 3501 can be further subdivided into CUs. For example, a coding tree can be applied to partition the CTU 3501 into CUs. A coding tree is a hierarchical data structure that applies an ordered list of one or more split modes to a video unit. A coding tree can be visualized with a largest video unit as a root node with progressively smaller nodes created by splits in parent nodes. Nodes that can no longer be split are referred to as leaf nodes. The leaf nodes created by application of a coding tree to a CTU are the CUs. The CU contains both luma components and chroma components.

In the present example, each CU is also a PTU 3503. Hence the CU and PTU 3503 are collectively depicted in schematic diagram 3500 by dashed lines. A PTU 3503 is structure containing both luma components and chroma components and that can be subdivided into PUs 3505 by application of a prediction splitting tree. A prediction splitting tree is a hierarchical data structure that applies an ordered list of one or more split modes to create PUs 3505. A PU 3505 is a group of samples that are encoded by the same prediction mode. The PUs 3505 are depicted in schematic diagram 3500 by dotted lines. The application of a coding tree to the PTU 3503 allows the PUs 3505 to be recursively generated based on different split patterns. For example, a PTU 3503 can be split by a QT split, a vertical BT split, a horizontal BT split, a vertical TT split, a horizontal TT split, a vertical UQT split, a horizontal UQT split, a vertical UBT split, a horizontal UBT split, a vertical EQT split, a horizontal EQT split, or combinations thereof.

Referring to FIG. 6, an example QT split is shown by quad tree partition 601 and results in four equally sized PUs created from a parent block. An example vertical BT split and horizontal BT split are shown by a vertical binary tree partition 603 and a horizontal binary tree partition 605, respectively, and results in two equally sized PUs created from a parent block. An example vertical TT split and horizontal TT split are shown by a vertical ternary tree partition 607 and a horizontal ternary tree partition 609, respectively. The TT results in three PUs created from a parent block, where a middle PU is half the size of the parent block and the remaining two PUs are of equal size and are collectively half the size of the parent block. A UQT split creates a non-symmetrical group of four PUs. For example, a horizontal UQT may generate four PUs with equal widths and varying heights, such as one half, one quarter, one eighth, and one eighth of the height of the parent block. For example, a vertical UQT may generate four PUs with equal heights and varying widths, such as one half, one quarter, one eighth, and one eighth of the width of the parent block. Referring to FIG. 8, splits 801 and 803 depict vertical UBT and splits 805 and 807 depict horizontal UBT. A UBT creates two PUs of unequal size, such as one quarter and three quarters of the size of the parent block. An EQT can split a parent block into four PUs of varying sizes. For example, EQT applies three splits that can be horizontal or vertical and applied in any order. An EQT with two or more horizontal splits is a horizontal EQT and an EQT with two or more vertical splits is a vertical EQT.

Such splits can be ordered in a split pattern according to the coding tree. This results in a highly customizable pattern of PUs 3505 of varying size. This also allows the encoder to generate PUs 3505 that match well with other blocks, and hence can be predicted by reference blocks with less residual, which reduces encoding size.

Figure 36:
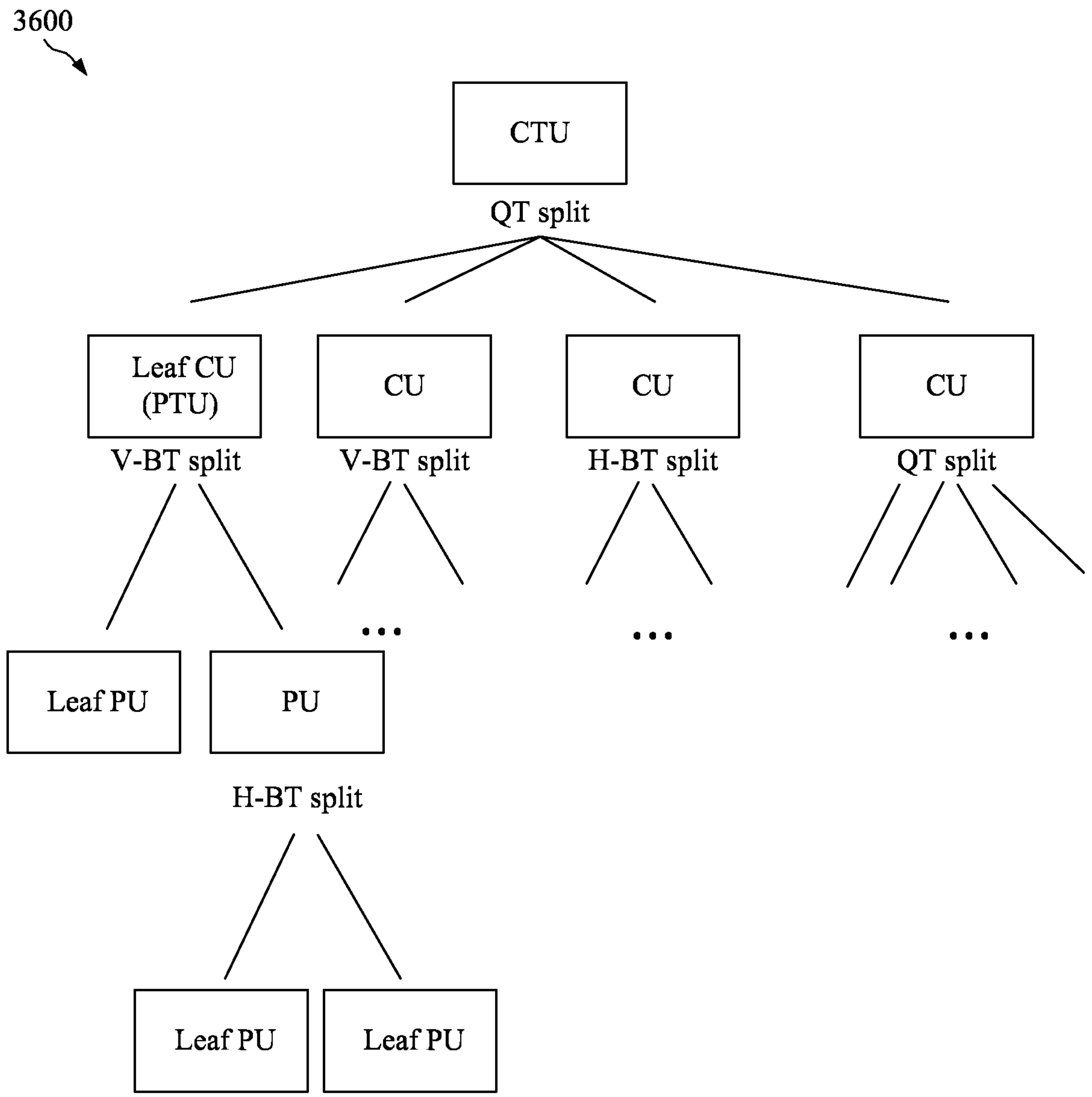
FIG. 36 is flow chart illustrating an example CTU split by recursive PUs.

FIG. 36 is flow chart 3600 illustrating an example CTU split by recursive PUs. As shown, a CTU is first split into CUs. This can be accomplished by applying various splits according to a coding tree. Leaves on the coding tree cannot be further split, and hence the coding tree leaves become CUs. The resulting CUs are then classified as PTUs. A prediction splitting tree is then applied to each PTU to generate PUs. A PTU that is not further split becomes a PU.

PTU can be split into PUs, which can be further spit into a plurality of PUs. The PUs that are leaf nodes on the prediction splitting tree are PUs. A prediction splitting tree is a coding tree applied to a PTU. In some examples, splits of PTU and/or PU may be allowed or disallowed based on a position of the PTU and/or PU relative to a picture or sub-picture border. In some examples, splits of PTU and/or PU may be allowed or disallowed based on a comparison of size and/or tree depth relative to various threshold values. Further, the selected split pattern used to partition a PTU can be coded in a bitstream by corresponding syntax or omitted from the bitstream and inferred by the decoder, depending on the example.

A recursive prediction unit is now discussed. In one example, a coding unit may be split into multiple PUs in a recursive way. For example, a CTU can be recursively split by a CU and PU split pattern as shown in FIG. 35 and/or a splitting tree structure as shown in FIG. 36. In one example, a CU may be associated with a prediction tree unit (PTU). A PTU may serve as a leaf PU, which is not allowed to be further split. A PTU may be split into multiple PUs. A PU may be split into multiple PUs. A PU may serve as a leaf PU. Different leaf PUs split from a PTU may have different prediction modes. Residues produced from multiple PUs split from a PTU may be transformed coded in a single transform unit (TU).

In one example, a PTU or a PU may be split into multiple PUs in different ways. For example, a PTU or a PU may be split into four PUs by a QT split. For example, a PTU or a PU may be split into two PUs by a vertical BT split. For example, a PTU or a PU may be split into two PUs by a horizontal BT split. For example, a PTU or a PU may be split into three PUs by a vertical TT split. For example, a PTU or a PU may be split into three PUs by a horizontal TT split. For example, a PTU or a PU may be split into four PUs by a vertical UQT split. For example, a PTU or a PU may be split into four PUs by a horizontal Unsymmetrical Quad Tree (UQT) split. For example, a PTU or a PU may be split into two PUs by a vertical UBT split. For example, a PTU or a PU may be split into two PUs by a horizontal UBT split. For example, a PTU or a PU may be split into four PUs by a vertical extended quad tree (EQT) split. For example, a PTU or a PU may be split into four PUs by a horizontal EQT split.

In one example, whether to and/or how to split a PTU or a PU may be signaled from an encoder to a decoder. In one example, a syntax element (such as a flag) may be signaled to indicate whether the PTU associated with a CU is further split into multiple PUs, or is not split and serves as a leaf PU. In one example, a syntax element (such as a flag) may be signaled to indicate whether a PU is further split into multiple PUs or is not split and serve as a leaf PU. In one example, one or multiple syntax element(s) may be signaled to indicate the splitting mechanism, which may comprise a splitting pattern (e.g., QT, BT, TT, UBT, UQT, and/or EQT) and/or the splitting direction (e.g., horizontal or vertical) for a PTU or a PU. In one example, the syntax element(s) indicating the splitting mechanism for a PTU or a PU may be conditionally signaled only when a decoder cannot infer whether the PTU or PU is further spilt. In one example, the syntax elements indicating whether to and/or how to split a PTU or a PU may be coded with context-based arithmetic coding. In one example, the syntax elements indicating whether to and/or how to split a PTU or a PU may be coded with bypass coding. In one example, all or part of the information indicating whether to and/or how to split a PTU or a PU may be signaled along with information indicating whether to and/or how to split a CTU or a CU.

In one example, a depth may be calculated for a PTU and/or PU. In one example, the depth may be a QT depth. The QT depth can be increased by K (e.g., K=1) for each ancestor PTU or PU of the current PTU and/or PU that is split by QT. In one example, the depth may be a MTT depth. The MTT depth can be increased by K (e.g., K=1) for each ancestor PTU or PU of the current PTU and/or PU that is split by any splitting method. In one example, the depth for a PTU may be initialized to be a fixed number such as zero. In one example, the depth for a PTU may be initialized to be a corresponding depth of the CU associated with the PTU.

In one example, whether to and/or how to split a PTU or a PU may be inferred by a decoder. In one example, the inference may depend on dimensions of the current CU, PTU, and/or PU. In one example, the inference may depend on the coding tree depth (such as QT depth or MTT depth) of the current CU, PTU, and/or PU. In one example, the inference may depend whether or not the current CU, PTU, and/or PU is at the picture and/or sub-picture boundary. In one example, if a decoder can infer that a PTU and/or PU cannot be further split, the syntax element indicating whether the PTU and/or PU should be split is not signaled. In one example, if a decoder can infer that a PTU and/or PU cannot be split with a specific splitting method, the syntax element(s) indicating the splitting method for the PTU and/or PU should be signaled accordingly to exclude the specific splitting method.

In one example, a PTU and/or PU is not allowed to be further split if a depth of the PTU/PU is larger/smaller than T, wherein T may be a fixed number or signaled from the encoder to the decoder. In one example, a PTU and/or PU is not allowed to be further split if the size of the PTU/PU is larger or smaller than T, wherein T may be a fixed number or signaled from the encoder to the decoder. In one example, a PTU and/or PU is not allowed to be further split if the width of the PTU or PU is larger or smaller than T1 and/or the height of the PTU and/or PU is larger or smaller than T2, wherein T1 or T2 may be fixed numbers or signaled from the encoder to the decoder.

In one example, a PTU/PU is not allowed to be further split if the maximum or minimum of the width of the PTU and/or PU and the height of the PTU and/or PU is larger or smaller than T, wherein T may be a fixed number or signaled from the encoder to the decoder. In one example, a specific splitting method is not allowed for a PTU and/or PU if a depth of the PTU and/or PU is larger or smaller than T, wherein T may be a fixed number or signaled from the encoder to the decoder. In one example, a specific splitting method is not allowed for a PTU and/or PU if the size of the PTU and/or PU is larger or smaller than T, wherein T may be a fixed number or signaled from the encoder to the decoder. In one example, a specific splitting method is not allowed for a PTU and/or PU if the width of the PTU and/or PU is larger or smaller than T1 and/or the height of the PTU and/or PU is larger or smaller than T2, wherein T1 or T2 may be fixed numbers or signaled from the encoder to the decoder. In one example, a specific splitting method is not allowed for a PTU and/or PU if the maximum or minimum one of the width of the PTU and/or PU and the height of the PTU and/or PU is larger or smaller than T, wherein T may be a fixed number or signaled from the encoder to the decoder.

The following are example technical problems solved by disclosed technical solutions. Examples video coding systems may not specify how to use different coding modes with recursive prediction units.

Disclosed herein are mechanisms to address one or more of the problems listed above. For example, a CTU can be split into CUs. Each CU can include a prediction tree unit (PTU). A prediction splitting tree is applied to the PTU to create PUs. Hence, the prediction splitting tree recursively splits each PTU into PUs. The prediction splitting tree may include internal nodes, which are nodes that apply a split to a region of the PTU and hence have child nodes. The prediction splitting tree also includes at least one leaf PU node, which is a node that does not apply a further split and hence has no child nodes and contains a partitioned PU. When no splits are applied to a PTU (the prediction splitting tree is a single node), the PTU is a leaf PU. When one or more splits are applied to the PTU by the prediction splitting tree, the leaf PU is split from the PTU. Prediction modes are applied to each PU. As such, prediction modes can be allowed or disallowed for each leaf PU. For example, intra mode, combined inter-intra prediction (CEP), template-matching-based inter-mode, and local illumination compensation (LIC) can be allowed when the leaf PU is the PTU and can be disallowed when the leaf PU is a PU split from the PTU. This has the effect of shutting off prediction coding tools for use with video units that are smaller than a CU. A similar functionality can be achieved by altering the functionality of prediction coding tools based on the leaf PU. For example, templates used for template-matching-based inter-mode and LIC can be calibrated to employ reconstruction samples when the leaf PU is the PTU and employ prediction samples when the leaf PU is a PU split from the PTU. Prediction samples are samples obtained from a matching reference block. Reconstructed samples are samples that include the prediction samples as modified by residual, and hence describe the region as encoded. In addition, PTU splitting, and hence whether a PTU is also a leaf PU, can be disallowed or allowed in various cases. For example, PTU splitting may be disallowed for PTUs in intra prediction (I) slices, for PTU chroma components, for PTUs contained in a CU portioned by a local dual tree, etc. This has the effect of preventing PUs that are smaller than a CU for use in intra prediction and for use with PU chroma components (e.g., to avoid complications due to chroma subsampling where chroma has a different block size than luma). In another example, transforms, inverse transforms, quantizations, and dequantizations can be altered based on whether the leaf PU is the PTU or the leaf PU is a PU split from the PTU. In addition, prediction samples on PU boundaries may be filtered and/or affected by overlapped block motion compensation (OBMC) prior to being used to generate residuals when the leaf PU is split from the PTU. Such functionality may be disallowed when the leaf PTU is the PTU.

Figure 37:
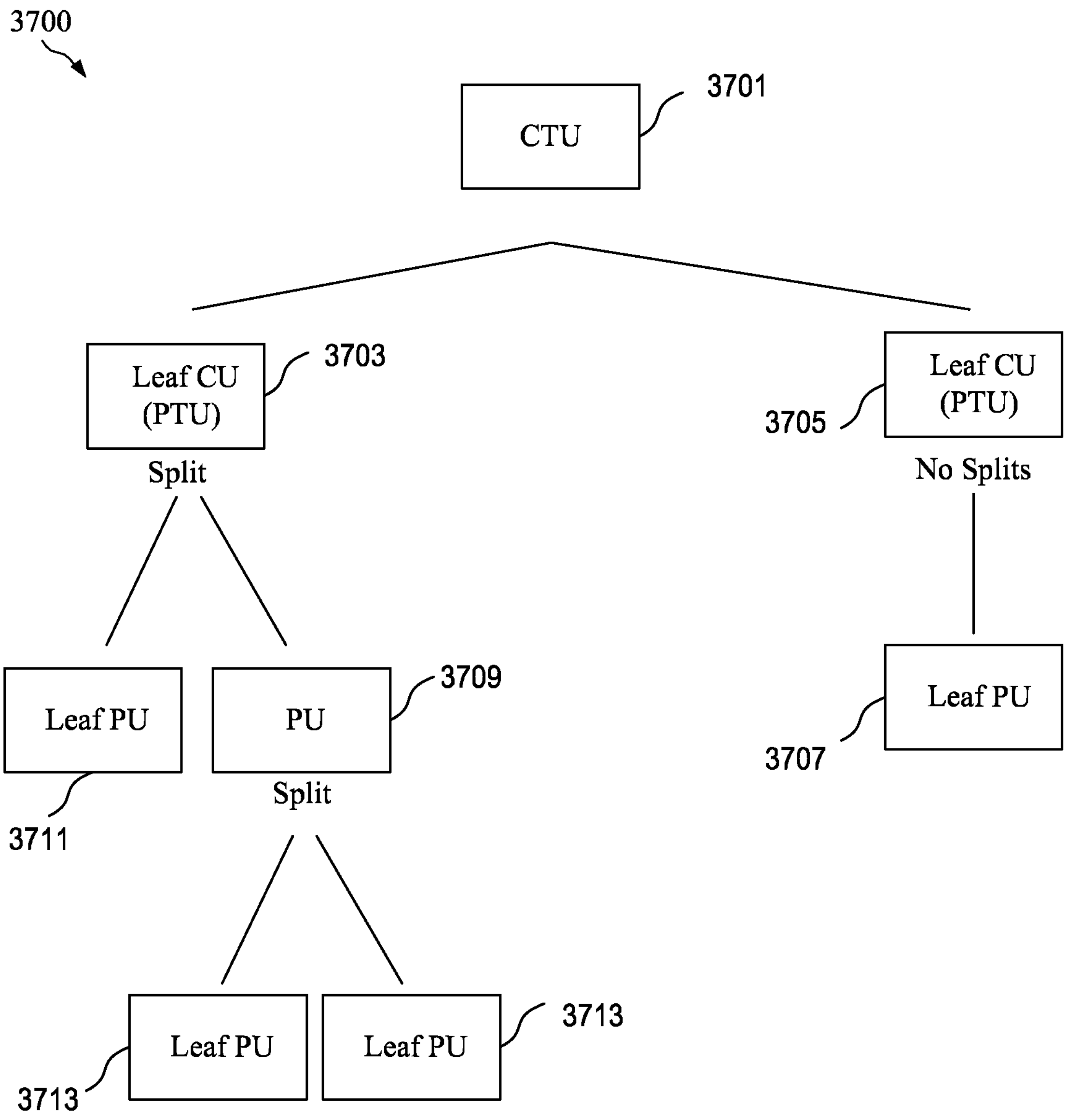
FIG. 37 is flow chart illustrating an example of leaf prediction units (PUs) split from a prediction tree unit (PTU).

FIG. 37 is flow chart 3700 illustrating an example of leaf prediction units (PUs) split from a prediction tree unit (PTU). Flow chart 3700 is substantially similar to flow chart 3600, but is modified to discuss example split scenarios. In flow chart 3700, a CTU 3701 is split into two leaf CUs, which are then classified as PTU 3703 and PTU 3705. PTU 3705 is not split further, which results in a leaf PU 3707. Since the PTU 3705 is not split, the leaf PU 3707, the PTU 3705, and the CU are the same size and include the same region of the picture. In contrast, PTU 3703 is further split into a leaf PU 3711 and a PU 3709. The PU 3709 is an internal node because the PU 3709 is further split into leaf PUs 3713. It should be noted that leaf PUs 3707, 3711, and 3713 may all be considered leaf nodes of a prediction splitting tree because they are each a node that is not further split. Further, PTU 3705 may also be considered a leaf node of a prediction splitting tree because the PTU 3705 is not further split. In addition, PTU 3705 and leaf PU 3707 are illustrated separately for clarity of discussion, but could be illustrated as a single block since the leaf PU 3707 is the PTU 3705.

As noted above, the present disclosure allows or disallows functionality based on whether a leaf PU 3707 is a PTU 3705 or whether a leaf PUs 3711 and 3713 is split from a PTU 3703. For example, intra mode, combined inter-intra prediction (CIIP), template-matching-based inter-mode, and local illumination compensation (LIC) are allowed for leaf PU 3707 because leaf PU 3707 is a PTU 3705. Such modes may be disallowed for leaf PUs 3711 and 3713 because leaf PUs 3711 and 3713 are split from PTU 3703. Intra mode is a prediction mode that predicts a block based on another block in the same picture (as opposed to inter mode which references blocks in a reference picture). CIIP uses both inter prediction and intra prediction to predict a block and employs weights to combine the results of the inter and intra modes into a single prediction. Template-matching-based inter-mode is an inter prediction mode that employs pixels adjacent to a current block to match pixels adjacent to candidate reference blocks to select a matching reference block. The adjacent pixels act as the template for the current block. LIC employs a linear model to perform an illumination transformation using a scaling factor and an offset.

Modes may also be allowed or disallowed for any leaf PU 3707, 3711, and 3713 by including a corresponding syntax element in a bitstream, for example in a sequence parameter set (SPS), picture parameter set (PPS), picture header, and/or slice header. Further, a syntax element that encodes a selected mode for a leaf PU may only contain coding options for allowed modes and may exclude disallowed modes. In addition, templates used for template-matching-based inter-mode and LIC can employ reconstruction samples for leaf PU 3707 because leaf PU 3707 is a PTU 3705. Templates used for template-matching-based inter-mode and LIC can employ prediction samples for leaf PU 3707, 3711, and 3713 because they have been split from PTU 3703. In another example, transforms, inverse transforms, quantizations, and dequantizations can be applied differently for a leaf PU 3707 that is a PTU 3705 than for leaf PUs 3707, 3711, and 3713 which are split from PTU 3703.

In another example, splitting may be allowed for a PTU, such as PTU 3703, or may be disallowed for a PTU, such as PTU 3705, in some cases. For example, PTU splitting may be disallowed for PTUs, such as PTU 3705, when the PTU is contained in an I slice, when the PTU contains chroma components, and/or when the PTU is included in a CU partitioned by a local dual tree. A local dual tree is a coding tree applied to a CU that employs different sub-trees for the luma component and the chroma component. PTU splitting may also be disallowed based on a syntax element in the SPS, PPS, picture header, and/or slice header. PTU splitting, such as PTU 3703, may otherwise be allowed.

Also, prediction samples on PU boundaries may be filtered and/or affected by overlapped block motion compensation (OBMC) prior to being used to generate residuals when the leaf PU is split from the PTU, for example as in leaf PUs 3711 and 3713. Such functionality may be disallowed when the leaf PTU is the PTU, for example as in leaf PU 3707. Filtering includes applying a filtering function to a block and/or boundaries thereof. Such filters may include in-loop filters such as a deblocking filter (DF), a sample adaptive offset (SAO) filter, and an adaptive loop filter (ALF). Such filtering may also include other pre and/or post processing filters. OBMC is an example filtering technique that employs a weighted average of overlapping block segments during motion prediction to reduce blocking effects caused by the prediction process.

The detailed embodiments below should be considered as examples to explain general concepts. These embodiments should not be interpreted in a narrow way. Furthermore, these embodiments can be combined in any manner In the following discussion, QT, BT, TT, UQT, and ETT may refer to QT split, BT split, TT split, UQT split and ETT split, respectively. In the following discussion, a block is a dyadic block if both width and height is a dyadic number, which is in a form of a 2N with N being a positive integer. The term block represents a group of samples associated with one-color, two-color, or three-color components, such as a CU, PU, TU, CB, PB, or TB. In the following discussion, a block is a non-dyadic block if at least one of width and height is a non-dyadic number, which cannot be represented in a form of a 2N with N being a positive integer. In the following discussion, split and partitioning have the same meaning.

EXAMPLE 1

In one example, whether a mode is allowed for a leaf PU may depend on whether the leaf PU is a non-split PTU, or whether the leaf PU is split from a PTU or PU.

EXAMPLE 2

In one example, if a mode is not allowed for a leaf PU, the syntax element indicating the mode may not be signaled.

EXAMPLE 3

In one example, if a mode is not allowed for a leaf PU, the syntax element indicating the mode may be signaled accordingly, while excluding the mode.

EXAMPLE 4

In one example, an intra mode is disallowed for a leaf PU when the leaf PU is split from a PTU or PU. For example, the syntax element indicating whether the intra mode is used may not be signaled for the leaf PU.

EXAMPLE 5

In one example, combined inter-intra prediction (CIIP) is disallowed for a leaf PU if the leaf PU is split from a PTU or PU.

EXAMPLE 6

In one example, template-matching-based inter-mode is disallowed for a leaf PU if the leaf PU is split from a PTU or PU.

EXAMPLE 7

In one example, Local Illumination Compensation (LIC) is disallowed for a leaf PU, if the leaf PU is split from a PTU or PU.

EXAMPLE 8

In one example, a template-matching-based intra-mode is disallowed for a leaf PU, if the leaf PU is split from a PTU or PU.

EXAMPLE 9

In one example, a mechanism for conducting a prediction method for a leaf PU may depend on whether the leaf PU is a non-split PTU or whether the leaf PU is split from a PTU or PU.

EXAMPLE 10

In one example, the template of the current block used in template-matching-based inter-mode may be prediction samples instead of reconstruction samples for a leaf PU if the leaf PU is split from a PTU or PU.

EXAMPLE 11

In one example, the template of the current block used in LIC may be prediction samples instead of reconstruction samples for a leaf PU if the leaf PU is split from a PTU or PU.

EXAMPLE 12

In one example, a mechanism for performing transform, an inverse transform, a quantization, a de-quantization, and/or an intra prediction on a CU may depend on whether the PTU associated with the CU is split or not.

EXAMPLE 13

Whether a PTU is allowed to be split may depend on slice and/or picture type. For example, a PTU is disallowed to be split on an I slice. Whether a PTU is allowed to be split may depend on color component. For example, a PTU is disallowed from splitting on chroma components. Whether a PTU is allowed to be split may depend on a syntax element, which may be signaled in a sequence parameter set (SPS), picture parameter set (PPS), picture header, and/or slice header. Whether a PTU is allowed to be split may depend the width and/or height of the PTU. For example, if the size of a PTU is less than a certain value, the PTU is not allowed to be split. Whether a PTU is allowed to be split may depend on whether a specific coding tool is used. For example, if local dual tree is used a PTU is disallowed from being split. Whether a PTU is allowed to be split may depend on whether a specific coding mode is used. For example, if intra mode is used, a PTU is disallowed to be split.

EXAMPLE 14

In one example, prediction samples on boundaries between two PUs of a CU may be operated before being used to generate residues.

EXAMPLE 15

For example, prediction samples on boundaries between two PUs of a CU may be filtered.

EXAMPLE 16

For example, prediction samples on boundaries between two PUs of a CU may be affected by Overlapped Block Motion Compensation (OBMC). For example, prediction samples near to the bottom boundary, the right boundary, the top boundary, and/or the left boundary of the current block may be affected by OBMC if the leaf PU is split from a PTU or PU.

EXAMPLE 17

In an example, any syntax element disclosed in the disclosure should be inferred to be a default value, such as 0 or 1, if the syntax element is not signaled in a specific condition.

Figure 38:
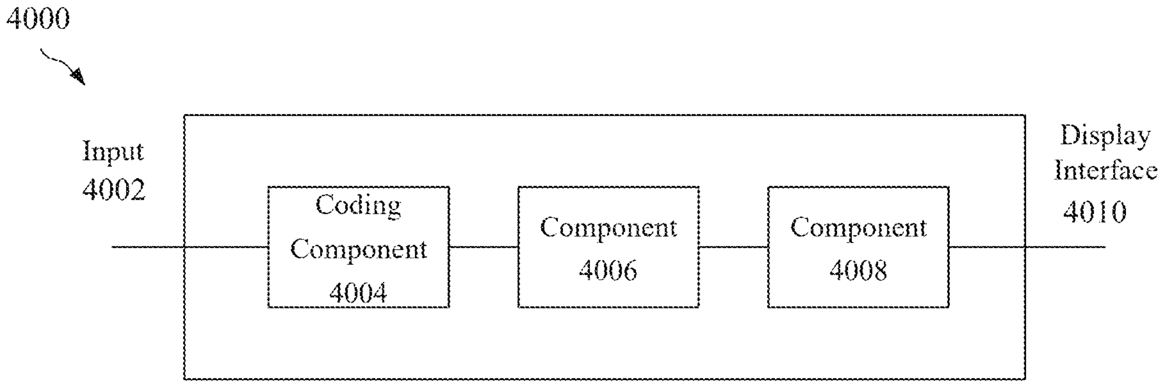
FIG. 38 is a block diagram showing an example video processing system.

FIG. 38 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 39:
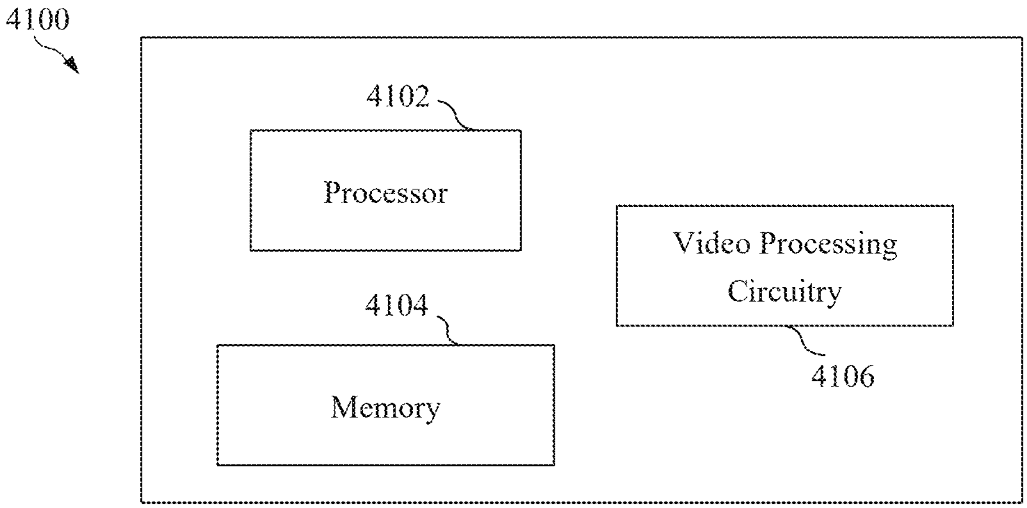
FIG. 39 is a block diagram of an example video processing apparatus.

FIG. 39 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

Figure 40:
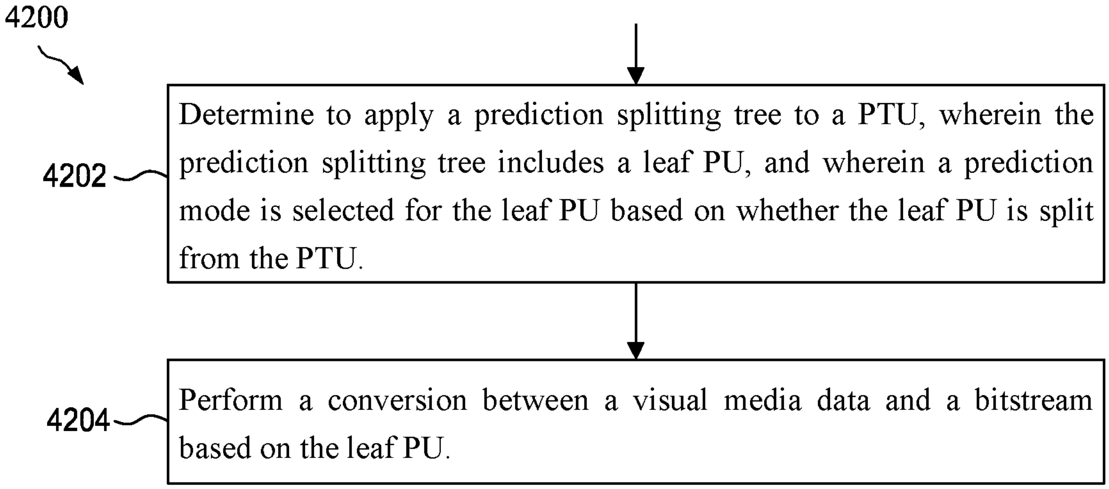
FIG. 40 is a flowchart for an example method of video processing.

FIG. 40 is a flowchart for an example method 4200 of video processing, for example as implemented on a video coding apparatus such as an encoder and/or a decoder. Method 4200 may be employed to recursively partition a CTU into PUs, for example as shown in FIGS. 35-37. At step 4202, a video coding device determines to apply a prediction splitting tree to a PTU. The prediction splitting tree includes a leaf PU. In an example, the prediction mode is selected for the leaf PU based on whether the leaf PU is split from the PTU. For example, intra mode may be disallowed for the leaf PU when the leaf PU is split from the PTU. Intra mode may be allowed when the leaf PU is the PTU. In an example, CIIP is disallowed for the leaf PU when the leaf PU is split from the PTU and allowed when the leaf PU is the PTU. In an example, template-matching-based inter mode is disallowed for the leaf PU when the leaf PU is split from the PTU and allowed when the leaf PU is the PTU. In an example, LIC is disallowed for the leaf PU when the leaf PU is split from the PTU and allowed when the leaf PU is the PTU.

In an example, an operation of the prediction mode selected for the leaf PU is based on whether the leaf PU is split from the PTU. For example, a template of a template-matching-based inter mode may employ prediction samples when the leaf PU is split from the PTU. Further, the template of the template-matching-based inter mode may employ reconstruction samples when the leaf PU is the PTU. In an example, a template for the leaf PU in LIC may employ prediction samples when the leaf PU is split from the PTU. Further, the template for the leaf PU in LIC may employ reconstruction samples when the leaf PU is the PTU. In an example, application of a transform, an inverse-transform, a quantization, an intra prediction, or a dequantization to a CU containing the leaf PU may depend on whether the leaf PU is split from the PTU.

In an example, splits may be disallowed for the PTU based on a slice type, a picture type, a syntax element in the bitstream, a width of the PTU, a height of the PTU, a coding tool, a specified coding mode, or combinations thereof. For example, splits may be disallowed for the PTU when the PTU is contained in an I slice. For example, splits may be disallowed for the PTU when the PTU contains chroma components. For example, splits may be disallowed for the PTU based on a syntax element contained in a SPS, a PPS, a picture header, a slice header, or combinations thereof. In an example, splits are disallowed for the PTU when a local dual tree is used on a CU containing the PTU.

In an example, prediction samples on boundaries between two PUs in a CU are filtered prior to being used for residual generation at an encoder, for example, when the leaf PU is split from the PTU. In an example, prediction samples on boundaries between two PUs in a CU are affected by OBMC prior to being used for residual generation at an encoder. In an example, prediction samples on a bottom boundary of the leaf PU or prediction samples on a right boundary of the leaf PU are affected by OBMC when the leaf PU is split from the PTU. Om am example, prediction samples on at least one of a bottom boundary, a top boundary, a right boundary, or a left boundary of the leaf PU are affected by OBMC when the leaf PU is split from the PTU.

In an example, a template-matching-based intra-mode is disallowed for the leaf PU when the leaf PU is split from the PTU. In an example, splits are disallowed for the PTU when a size of the PTU is less than a certain value. In an example, splits are disallowed for the PTU when an intra mode is used. In an example, the leaf PU being split from the PTU comprises the leaf PU being split from a PU of the PTU.

At step 4204, the video coding device performs a conversion between a visual media data and a bitstream based on the leaf PU. In some examples, the conversion includes encoding the visual media data into the bitstream. In some examples, the conversion includes decoding the bitstream to obtain the visual media data. In some examples, the bitstream includes a syntax element indicating the prediction mode selected for the leaf PU, for example in a SPS, a PPS, a picture header, and/or a slice header. For example, the syntax element may exclude indications for all modes that are disallowed for the leaf PU. In an example, the syntax element includes a code word and the code word does not include an encoding option for the disallowed modes. In some examples, the bitstream does not include any syntax element indicating any prediction mode that is disallowed for the leaf PU.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 41:
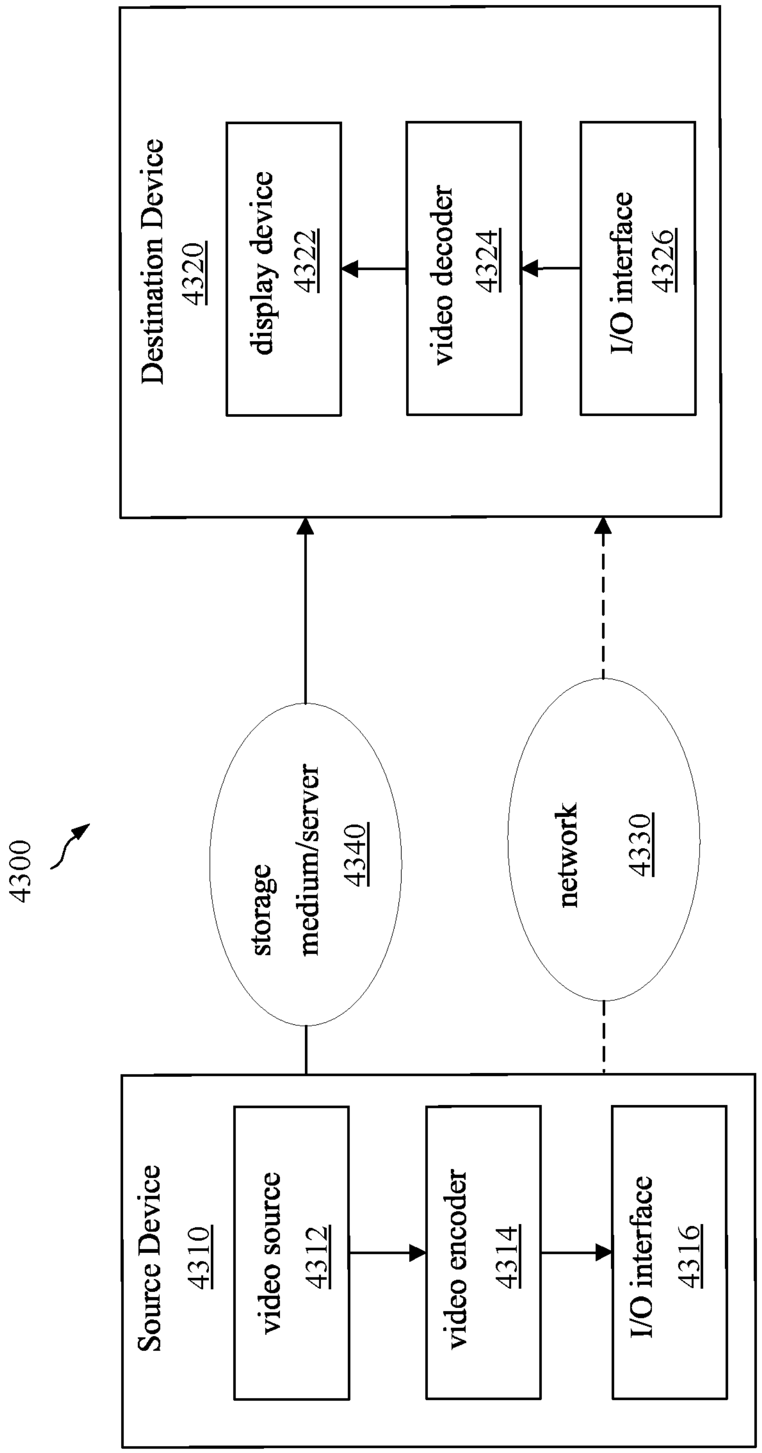
FIG. 41 is a block diagram that illustrates an example video coding system.

FIG. 41 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 42:
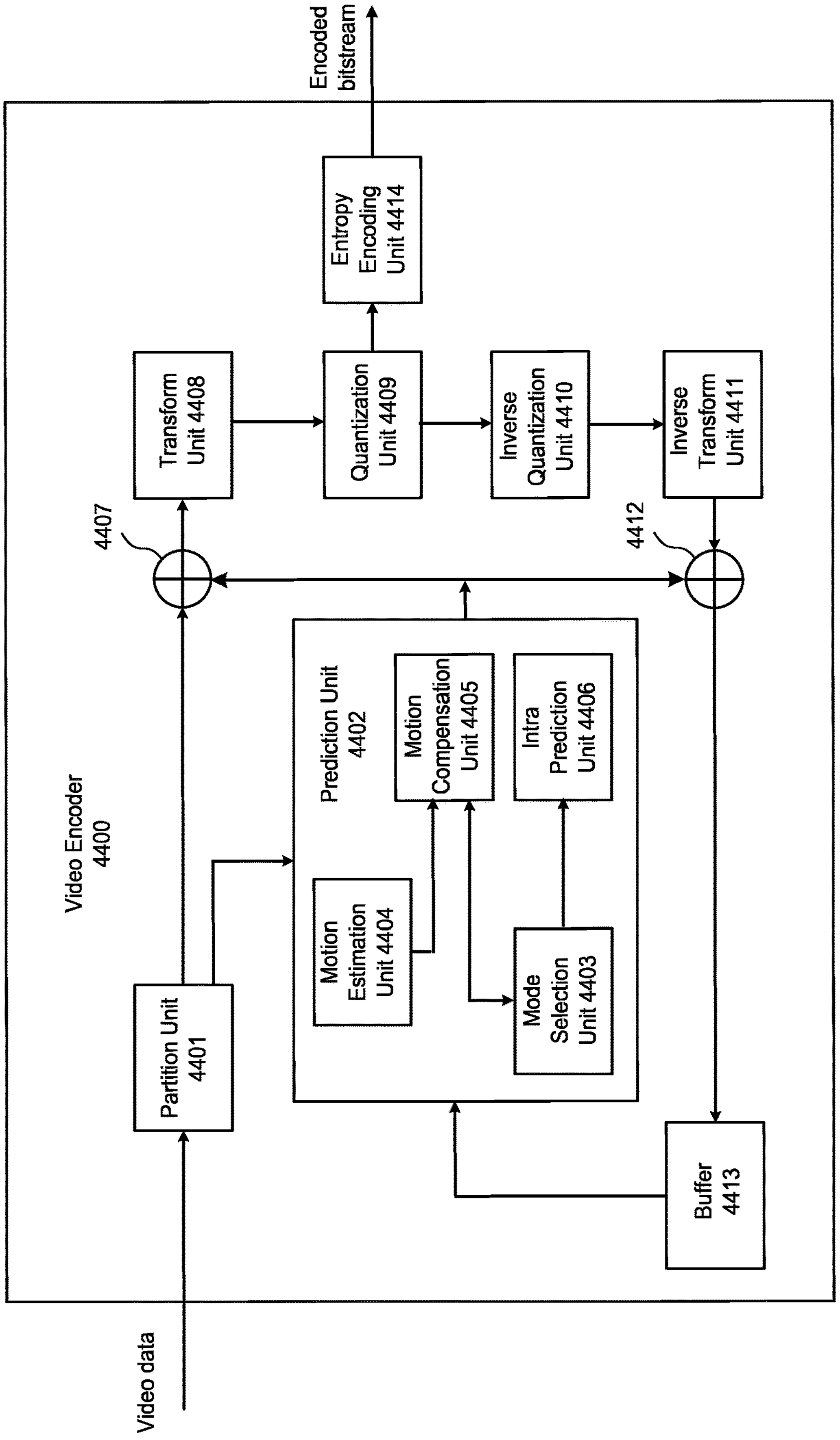
FIG. 42 is a block diagram that illustrates an example encoder.

FIG. 42 is a block diagram illustrating an example of video encoder 4400, which may be video encoder 4314 in the system 4300 illustrated in FIG. 41. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 43:
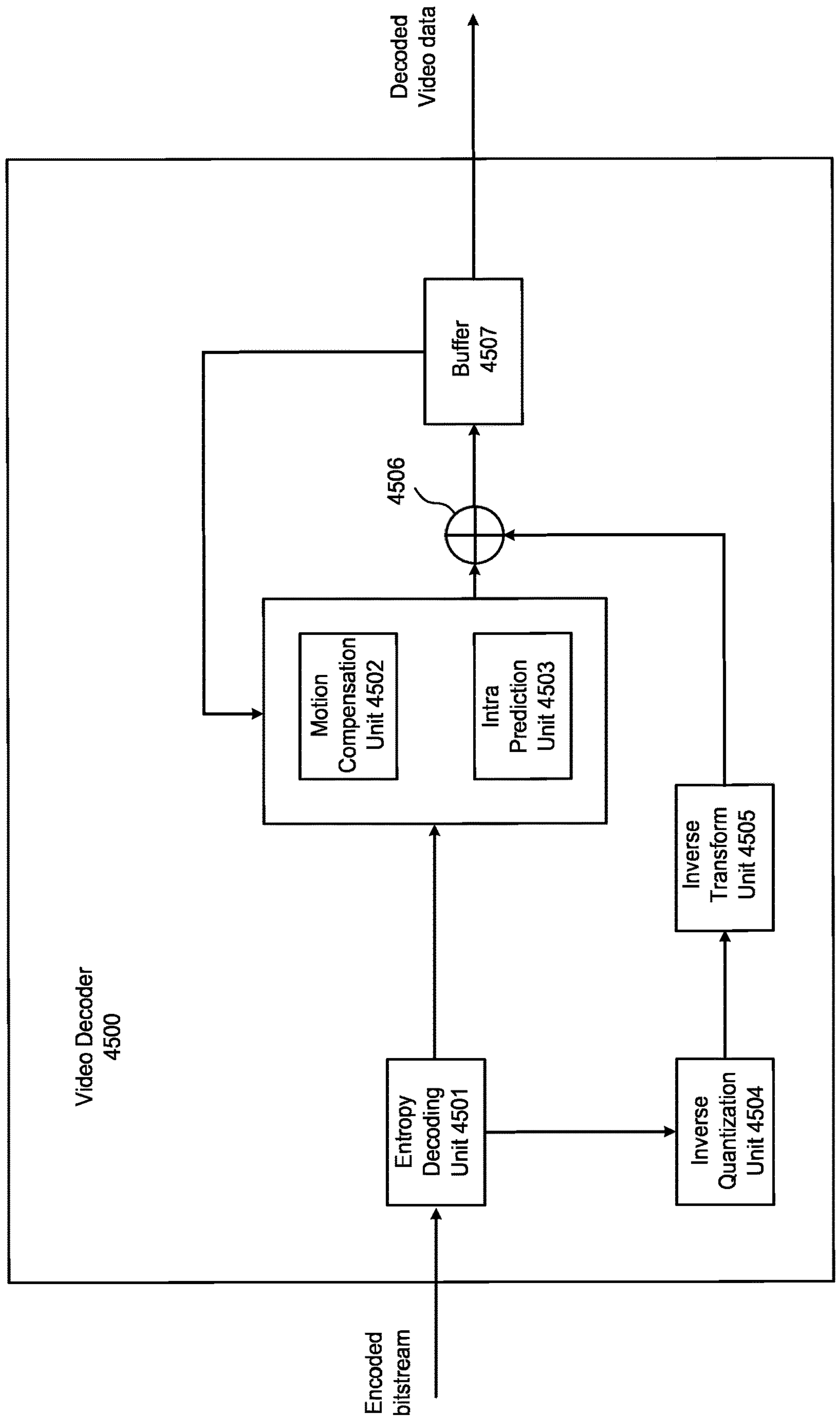
FIG. 43 is a block diagram that illustrates an example decoder.

FIG. 43 is a block diagram illustrating an example of video decoder 4500 which may be video decoder 4324 in the system 4300 illustrated in FIG. 41. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 44:
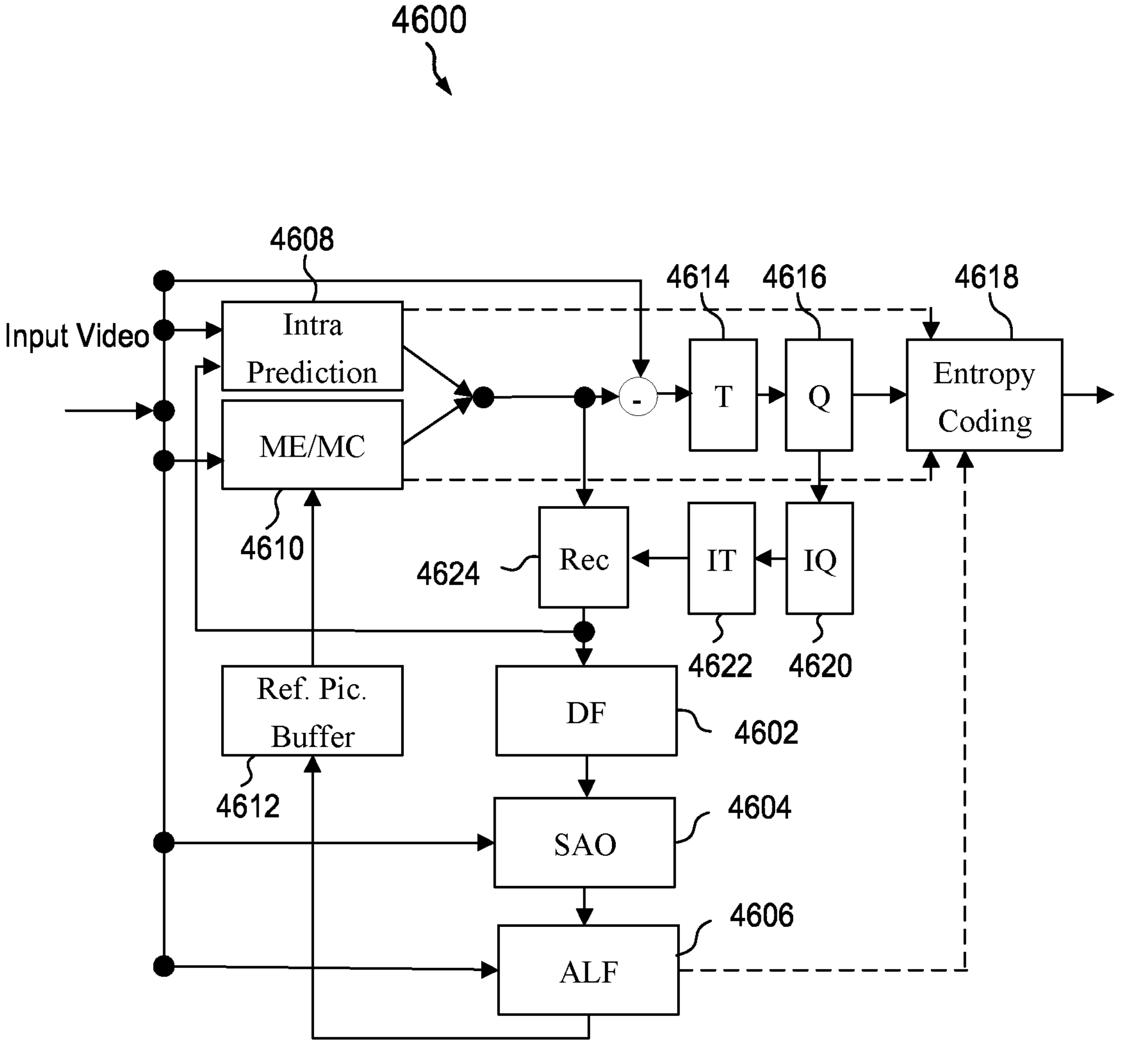
FIG. 44 is a schematic diagram of an example encoder.

FIG. 44 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A video processing method (e.g., method 4200 depicted in FIG. 40), comprising: determining whether or how a video block is split into multiple partitions according to a rule; and performing a conversion between the video block and a bitstream of the video based on the determining
2. The method of solution 1, wherein the video block is a coding unit (CU) associated with a prediction tree unit (PTU).
3. The method of solution 1-2, wherein the rule specifies that the video block is split into multiple prediction units (PUs).
4. The method of solution 2-3, wherein the rule specifies that further partitioning of the video block is disabled in case that the video block is a prediction tree unit that is a leaf PU.
5. The method of solution 1, wherein the video block is a prediction tree unit (PTU) or a prediction unit (PU)
6. The method of solution 5, wherein the rule specifies to split the video block into four PUs using a quadtree split or two PUs using a vertical binary tree split.
7. The method of any of above solutions, wherein the multiple partitions are indicated in the bitstream using one or more syntax elements.
8. The method of solution 7, wherein the one or more syntax elements include a syntax element that indicates whether the PTU associated with the video block is further split or whether the PTU associated with the video block is a leaf PU.
9. The method of any of above solutions, wherein the conversion includes calculating a depth for the video block.
10. The method of solution 9, wherein the depth comprises a quadtree depth that increases in value depending on a number of ancestor PTUs or PUs.
11. The method of solution 9, wherein the depth comprises a multiple type tree (MTT) depth.
12. The method of any of solutions 1-6, wherein the multiple partitions are not coded in the bitstream and are inferred at a decoder according to an inferring rule.

13. The method of solution 12, wherein the inferring rule is based on a dimension of the video block or a coding tree depth of the video block.
14. The method of solution 12, wherein the inferring rule is based on a coding mode of the video block.
15. The method of any of above solutions, wherein a syntax element in the bitstream is inferred to have a default value in case that the syntax element is omitted from the bitstream.
16. The method of any of solutions 1-15, wherein the conversion includes generating the bitstream from the video.
17. The method of any of solutions 1-15, wherein the conversion includes generating the video from the bitstream.
18. A method of storing a bitstream on a computer-readable medium, comprising generating a bitstream according to a method recited in any one or more of solutions 1-15 and storing the bitstream on the computer-readable medium.
19. A computer-readable medium having a bitstream of a video stored thereon, the bitstream, when processed by a processor of a video decoder, causing the video decoder to generate the video, wherein the bitstream is generated according to a method recited in one or more of solutions 1-18.
20. A video decoding apparatus comprising a processor configured to implement a method recited in one or more of solutions 1 to 18.
21. A video encoding apparatus comprising a processor configured to implement a method recited in one or more of solutions 1 to 18.
22. A computer program product having computer code stored thereon, the code, when executed by a processor, causes the processor to implement a method recited in any of solutions 1 to 18.
23. A computer readable medium on which a bitstream complying to a bitstream format that is generated according to any of solutions 1 to 18.
24. A method, an apparatus, a bitstream generated according to a disclosed method or a system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:

determining, for a conversion between a leaf prediction unit of a video and a bitstream of the video, whether a prediction mode is allowed for the leaf prediction unit according to a rule; and performing the conversion based on the determining, wherein the rule specifies that whether the prediction mode is allowed for the leaf prediction unit depends on whether the leaf prediction unit is a non-split prediction tree unit, or is split from a prediction tree unit (PTU) or a prediction unit (PU), wherein the rule further specifies that an operation of the prediction mode selected for the leaf prediction unit depends on whether the leaf prediction unit is the non-split prediction tree unit, or is split from the PTU or the PU, and wherein a template for the leaf prediction unit in local illumination compensation (LIC) mode employs prediction samples, instead of reconstruction samples, when the leaf prediction unit is split from the PTU or the PU.

2. The method of claim 1, wherein one of the following prediction modes is disallowed for the leaf prediction unit when the leaf prediction unit is split from the PTU or the PU:

an intra mode;

a combined inter-intra prediction (CIIP) mode;

a template-matching-based inter mode; or a local illumination compensation (LIC) mode.

3. The method of claim 1, wherein the bitstream does not include any syntax element indicating any prediction mode that is disallowed for the leaf prediction unit.

4. The method of claim 1, wherein a template of a template-matching-based inter mode employs prediction samples, instead of reconstruction samples, when the leaf prediction unit is split from the PTU or the PU.

5. The method of claim 3, wherein syntax elements which are not signaled in the bitstream are inferred to a default value.

6. The method of claim 1, wherein application of a transform, an inverse-transform, a quantization, or a dequantization to a coding unit (CU) containing the leaf prediction unit depends on whether the leaf prediction unit is split or not.

7. The method of claim 1, wherein whether the PTU is allowed to be split depends on at least one of: a slice type, a color component, a second syntax element signaled in the bitstream, or an application of a specific coding tool.

8. The method of claim 7, wherein splits are disallowed for the PTU when the PTU is contained in an intra coding (I) slice; or wherein splits are disallowed for the PTU when the PTU contains chroma components.

9. The method of claim 7, wherein the second syntax element is contained in a sequence parameter set (SPS), a picture parameter set (PPS), a picture header, or a slice header.

10. The method of claim 7, wherein splits are disallowed for the PTU when a local dual tree is used on a CU containing the PTU.

11. The method of claim 1, wherein prediction samples on boundaries between two PUs in a CU are filtered prior to being used for residual generation.

12. The method of claim 1, wherein prediction samples on boundaries between two PUs in a CU are affected by overlapped block motion compensation (OBMC) prior to being used for residual generation.

13. The method of claim 1, wherein prediction samples on at least one of a bottom boundary, a top boundary, a right boundary, or a left boundary of the leaf prediction unit are affected by OBMC when the leaf prediction unit is split from the PTU or the PU.

14. The method of claim 1, wherein the conversion includes encoding the video into the bitstream.

15. The method of claim 1, wherein the conversion includes decoding the video from the bitstream.

16. The method of claim 1, wherein the bitstream includes a first syntax element indicating the prediction mode selected for the leaf prediction unit, and wherein the first syntax element excludes indications for all prediction modes that are disallowed for the leaf prediction unit.

17. An apparatus for processing video data comprising: a processor; and a non-transitory memory with instructions thereon, wherein the instructions upon execution by the processor, cause the processor to:

determine, for a conversion between a leaf prediction unit of a video and a bitstream of the video, whether a prediction mode is allowed for the leaf prediction unit according to a rule; and perform the conversion based on the determination, wherein the rule specifies that whether the prediction mode is allowed for the leaf prediction unit depends on whether the leaf prediction unit is a non-split prediction tree unit, or is split from a prediction tree unit (PTU) or a prediction unit (PU), wherein the rule further specifies that an operation of the prediction mode selected for the leaf prediction unit depends on whether the leaf prediction unit is the non-split prediction tree unit, or is split from the PTU or the PU, and wherein a template for the leaf prediction unit in local illumination compensation (LIC) mode employs prediction samples, instead of reconstruction samples, when the leaf prediction unit is split from the PTU or the PU.

18. A non-transitory computer-readable storage medium storing instructions that cause a processor to:

determine, for a conversion between a leaf prediction unit of a video and a bitstream of the video, whether a prediction mode is allowed for the leaf prediction unit according to a rule; and perform the conversion based on the determination, wherein the rule specifies that whether the prediction mode is allowed for the leaf prediction unit depends on whether the leaf prediction unit is a non-split prediction tree unit, or is split from a prediction tree unit (PTU) or a prediction unit (PU), wherein the rule further specifies that an operation of the prediction mode selected for the leaf prediction unit depends on whether the leaf prediction unit is the non-split prediction tree unit, or is split from the PTU or the PU, and wherein a template for the leaf prediction unit in local illumination compensation (LIC) mode employs prediction samples, instead of reconstruction samples, when the leaf prediction unit is split from the PTU or the PU.

* * * * *